(12) United States Patent
Wylie et al.

(10) Patent No.: US 10,069,680 B1
(45) Date of Patent: Sep. 4, 2018

(54) DEDICATED VIRTUAL COMPUTING SYSTEM SERVERS

(71) Applicant: Amazon Technologies, Inc., Seattle, WA (US)

(72) Inventors: Damian Gorman Wylie, Seattle, WA (US); James Alfred Gordon Greenfield, Cape Town (ZA); Michael Groenewald, Cape Town (ZA); Anand Rajender Kumar, Seattle, WA (US); Rajnesh Umeshraya Pai, Kirkland, WA (US); Sivaprasad Venkata Padisetty, Bellevue, WA (US); Georgios Elissaios, Seattle, WA (US); Scott Anthony Roberts, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 505 days.

(21) Appl. No.: 14/659,477

(22) Filed: Mar. 16, 2015

(51) Int. Cl.
*H04L 12/24* (2006.01)
*H04L 29/08* (2006.01)

(52) U.S. Cl.
CPC .......... *H04L 41/0806* (2013.01); *H04L 67/16* (2013.01)

(58) Field of Classification Search
CPC ........................... H04L 41/0806; H04L 67/16
See application file for complete search history.

(56) References Cited

U.S. PATENT DOCUMENTS

| | | | | |
|---|---|---|---|---|
| 2008/0201414 | A1* | 8/2008 | Amir Husain | G06F 9/445 709/203 |
| 2008/0244579 | A1* | 10/2008 | Muller | G06F 9/5027 718/100 |
| 2011/0173637 | A1* | 7/2011 | Brandwine | G06F 9/5072 719/314 |
| 2014/0280961 | A1* | 9/2014 | Martinez | H04L 41/5054 709/226 |
| 2016/0162666 | A1* | 6/2016 | Casey | G06F 9/45558 726/29 |

OTHER PUBLICATIONS

"Understanding MAK Activation," Microsoft TechNet, ©2015 Microsoft, <http://technet.microsoft.com/en-us/library/ff793435.aspx> [retrieved Apr. 14, 2015], 1 page.

* cited by examiner

*Primary Examiner* — Sargon Nano
*Assistant Examiner* — Afroza Sultana
(74) *Attorney, Agent, or Firm* — Davis Wright Tremaine LLP

(57) ABSTRACT

A virtual computer system service receives a request from a customer to provision a dedicated server for the exclusive use of the customer. The dedicated server may be used to launch one or more virtual machine instances. The virtual computer system service subsequently selects, from a pool of available servers, a server that can be dedicated to the customer and that does not have capacity allocated to any other customer. The virtual computer system service may update a database to specify, in an entry corresponding to the selected server, that the server has been dedicated for the exclusive use of the customer. Once the database has been updated, the virtual computer system service will enable the customer to launch a virtual machine instance using the dedicated server.

20 Claims, 12 Drawing Sheets

DEDICATED VIRTUAL COMPUTING SYSTEM SERVERS

BACKGROUND

Virtual computer systems have evolved and continue to evolve to keep up with the demands of the organizations that use them. Many organizations, for example, utilize virtual computer systems for, among other reasons, the purpose of remotely operating one or more virtual servers. Despite their many advantages, modern virtual computer system services often lack functionality for providing a customer with dedicated servers for launching virtual machine instances using hardware that is solely dedicated to the customer's business needs. Further, these virtual computer system services often lack the ability to enable customers to provide their own operating system volume licenses, as this would require the capability to repeatedly target virtual machine instance launches onto the same dedicated hardware.

BRIEF DESCRIPTION OF THE DRAWINGS

Various embodiments in accordance with the present disclosure will be described with reference to the drawings, in which.

DETAILED DESCRIPTION

Figure 1:
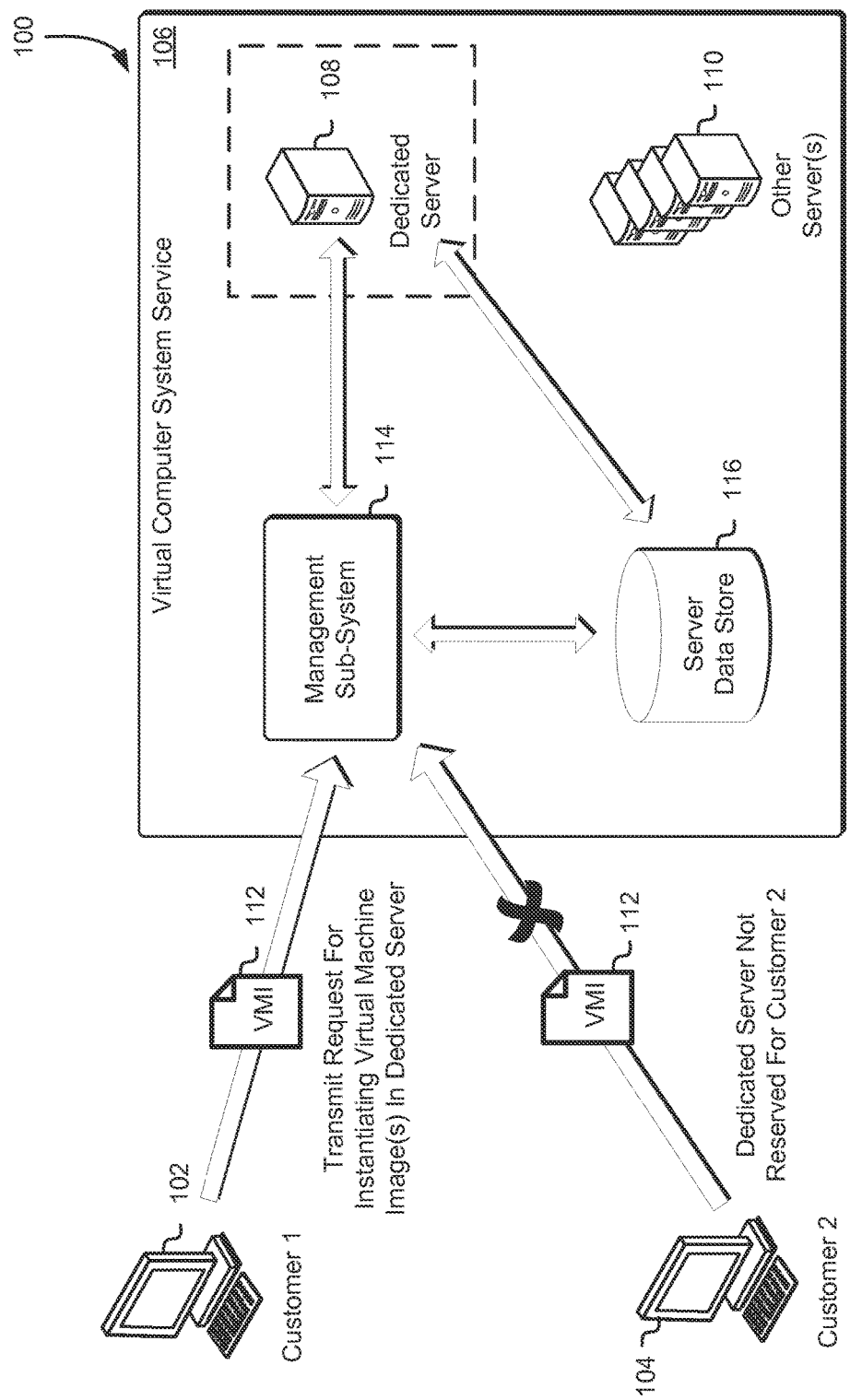
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the provisioning and reservation of a dedicated server for the instantiation of a virtual machine instance on behalf of a customer. In an embodiment, a virtual computer system service, operated and managed by a computing resource service provider, receives a request from an entity (e.g., an organization or individual) to provision a dedicated server that can be utilized for launching a variety of virtual machine instances. The dedicated server may be provisioned by the virtual computer system service only for the entity's usage. Thus, the virtual computer system service may be configured to prevent any other entities from launching any virtual machine instances within this dedicated server. The entity may be a customer of the computing resource service provider that operates various services such as the aforementioned virtual computer system service, object-based data storage services, database services and other services.

Upon receiving the request from the entity, the virtual computer system service may identify a variety of servers that may be suitable for dedication and, if any are identified, select a server that can be provisioned and dedicated to the entity. Once the virtual computer system service has provisioned a dedicated server in response to the entity's request, the virtual computer system service may generate a server identifier that corresponds to the server; update a server database to indicate the identifier and that the dedicated server has been assigned to the entity; and send the identifier to the entity. This may prevent any other entity from accessing and utilizing the dedicated server for their own virtual machine instances while the server is allocated to the customer. The virtual computer system service may enable the entity to specify launch of a virtual machine instance using the dedicated server by indicating an identifier of the dedicated server through an interface provided by the virtual computer system service and the particular virtual machine instance to be launched (e.g., selection of a virtual machine image that can be instantiated, etc.).

In an embodiment, once the dedicated server has been provisioned for the entity's use, the virtual computer system service can receive a request from the entity to launch a virtual machine instance using the dedicated server by specifying the server identifier in the launch request. For the particular virtual machine instance, the entity may provide his/her own operating system volume license, which may be required to enable launch of the virtual machine instance within the same dedicated server without requiring an additional license for utilizing the virtual machine instance using different hardware.

At any time, the entity release the dedicated server used to operate his/her virtual machine instances. For example, when an entity acquires a dedicated server, the entity may specify an "Auto-Release" parameter. If the "Auto-Release" parameter is enabled, the entity may release the dedicated server by stopping or terminating all the running virtual machines on the server (e.g., by API calls that cause the management sub-system to stop or terminate the virtual machines as part of fulfilling the API calls). In this event, the database is updated to reflect that server is no longer dedicated to the entity. If the "Auto-Release" parameter is not enabled, even if the customer stops or terminates all the instances on the server, the server may continue to be reserved for the entity. In this configuration, the entity may release the server by sending a "ReleaseServer" web service request to an application programming interface (API) and pass the server identifier as a parameter in the request. With the "Auto-Release" parameter, the entity may stop or terminate all the virtual machine instances and maintain the entity's reservation of the dedicated server within the server database. This may enable the entity to access this dedicated server at a later time. In some embodiments, if the dedicated server was provisioned on an on-demand basis (e.g., provisioned based on the entity's immediate demand for a dedicated server), the "AutoRelease" parameter may be automatically set so the virtual computer system service may release the dedicated server into a capacity pool for servers that can be used for virtual machine instantiation and update the server database to indicate that server is no longer dedicated for the entity's sole use.

If the entity did not release the reservation and requests a re-launch of the virtual machine instance within a dedicated server and specifies the server identifier in the request, the virtual computer system service may identify the original dedicated server. If the original dedicated server was released by the virtual computer system service in response to an entity request or does not have sufficient capacity for instantiating the virtual machine instance, the virtual computer system service may attempt to recapture the released dedicated server and, if available, utilize this original dedicated server to re-launch the virtual machine instance. However, if the original dedicated server is unavailable, whether due to insufficient capacity or usage by another entity as a result of the release of the server, the virtual computer system service may provision a new dedicated server for the entity that can be used to re-launch the virtual machine instance.

In this manner, a computing resource service provider can provision a dedicated server to an entity, which may be used for launching virtual machine instances while preventing other entities from using the resources of the dedicated server for their own virtual machine instances. In addition, the techniques described and suggested herein facilitate additional technical advantages. For example, because, in some embodiments, the virtual computer system service may attempt to re-launch a virtual machine instance within the original dedicated server in which the virtual machine instance was operating, the entity may not incur an additional operating system volume licensing fee for launching the virtual machine instance using different hardware. This may enable the entity to provide his/her own license and repeatedly target their virtual machine instance launches onto the same dedicated hardware.

FIG. 1 shows an illustrative example of an environment 100 in which various embodiments can be implemented. In the environment 100, a customer 102 (e.g., Customer 1) transmits a request to a virtual computer system service 106 to launch a virtual machine instance 112 within a dedicated server 108. The virtual computer system service 106 may maintain one or more servers 108 that are allocated for use as dedicated servers for one or more customers of the virtual computer system service 106. These one or more servers may be distinct from other servers 110 the virtual computer system service 106 may provide to its customers in that these other servers 110 may be used for instantiation of various virtual machine images for a variety of customers of the virtual computer system service 106. Thus, each of these other servers 110 may include one or more virtual machine images for different customers. In some embodiments, the virtual computer system service 106 may enable any server furnished by the virtual computer system service 106 to be utilized as a dedicated server 108 upon request.

The customer 102 may previously have requested reservation and provisioning of one or more dedicated servers 108 through an interface provided by the virtual computer system service 106. For instance, the customer 102 may request that the virtual computer system service 106 reserve one or more dedicated servers 108 for a specified period of time for his/her business needs. A management sub-system 114 of the virtual computer system service 106 may, in response to the request, reserve these one or more dedicated servers 108 and may access a server data store 116 to update a server database to specify that these particular dedicated servers 108 have been allocated for the customer's 102 exclusive use. Additionally, the customer 102 may provide the virtual computer system service 106 with his/her operating system volume license, which the virtual computer system service 106 may use to enable the same virtual machine instance 112 to be launched and, later, re-launched within the same dedicated server 108.

In an embodiment, the customer 102 may submit a request to launch the virtual machine instance 112 within a dedicated server 108 without having previously reserved the dedicated server 108 for his/her exclusive use. In such instances, the management sub-system 114 may identify one or more servers that may be dedicated for the customer's 102 exclusive use and, if available, provision these one or more servers on-demand to the customer 102. The management sub-system 114 may similarly access the server data store 116 upon provisioning these one or more on-demand dedicated servers 108 and specify, within a database, that these particular dedicated servers 108 have been provisioned for the customer's 102 exclusive use. If, at a later time, the customer 102 releases these on-demand dedicated servers 108, the management sub-system 114 may add these servers to the capacity pool and enable other customers to provision these dedicated servers for their use. Alternatively, if the virtual computer system service 106 does not maintain a pool of dedicated servers 108 that may be allocated to its customers upon request, the management sub-system 114 may enable these servers to be utilized for any purpose and by any number of customers. In some embodiments, when the customer 102 reserves one or more dedicated servers 108 for his/her exclusive use or the one or more dedicated servers 108 are provisioned on-demand, the management sub-system 114 may create a reservation identifier for each of the one or more dedicated servers 108, which may represent the servers 108, and send the reservation identifiers to the customer 102. For example, the customer may submit an "AcquireServer" web service request to an API and pass in the request parameters such as an account identifier for the customer 102, virtual machine instance types the customer 102 would like to host on the dedicated server 108, information such as a number of processors, amount of memory, amount of storage, amount of networking capacity, etc. In response to the request, the management sub-system 114 may search for a dedicated server 108 that is available to be reserved and satisfies the parameters in the request in a database within the server data store 116. If a dedicated server 108 can be identified, the management sub-system may generate a reservation identifier such as a randomly-generated alphanumeric value, a value that relates to the characteristics of the customer 102 that has submitted the request to create the reservation (e.g., Bob's first reservation), a value that relates to the characteristics of the reserved dedicated server 108 (e.g., Instance Type ABC reservation), a sequence number, or a sequence number or other value that has been obfuscated (e.g., through encryption). The management sub-system 114 may access the server data store 116 to store the reservation identifier in the database in association with an identifier used by the virtual computer system service 106 to internally identify the dedicated server 108 and send the reservation identifier back to the customer 102. In addition, in some embodiments the management sub-system 114 may update a record within an accounting database to enable billing of the customer 102 in accordance with use of the one or more dedicated servers 108. The database may, for instance record usage of dedicated servers (and, in some embodiments, other computing resources) for multiple customers so that customers can be charged for dedicated servers in accordance with their usage. For example, the customer 102 may be charged for the amount of time the one or more dedicated servers 108 are allocated for his/her exclusive use (e.g., per minute, per hour, etc.). Alternatively, the customer 102 may be charged for the amount of time the one or more dedicated servers 108 are actually used for the one or more virtual machine instances launched using the one or more dedicated servers 108. This may differ from other billing schema, wherein a customer 102 may be charged for the capacity utilized within a server when launching a virtual machine instance or for the dedication of the virtual machine instance itself.

If the customer 102 has previously reserved one or more dedicated servers 108 for his/her use, the customer 102, when submitting a request to the virtual computer system service 106 to launch a virtual machine instance 112, may specify which dedicated server 108 may be used for instantiating the virtual machine instance 112. If the selected dedicated server 108 does not have sufficient capacity to support the virtual machine instance 112, the management sub-system 114 may access the database within the server data store 116 to evaluate the customer's 102 other reserved dedicated servers 108 to determine if any of these servers have sufficient capacity to support the virtual machine instance 112 to be launched. Subsequently, if no capacity can be found, the management sub-system 114 may provision a new dedicated server 108 that is capable of being utilized for the virtual machine instance 112. Under such circumstances, the virtual computer system service 106 may access the server database in the server data store 116 and indicate that this newly dedicated server has been allocated for the customer 102.

In some embodiments, if the virtual machine instance 112 requires the customer 102 to provide his/her own operating system volume license, the management sub-system 114 may specify, in the server data store 116, the server that is being used to launch the virtual machine instance 112 and the corresponding license obtained from the customer 102. If, at a later time, the customer 102 submits a web service request to a "ReleaseServer" API to release the dedicated server 108 or submits a web service request to a "StopInstance" API to stop the virtual machine instance 112 and wishes to re-launch the virtual machine instance 112 by submitting a web service request to a "RunInstance" API, the management sub-system 114 may attempt to re-launch the virtual machine instance 112 within the same dedicated server 108. For instance, the management sub-system 114 may access the server data store 116 to identify the particular dedicated server 108 that was previously used to instantiate the virtual machine instance 112. Subsequently, the management sub-system 114 may determine whether this particular dedicated server 108 is available and has sufficient capacity to support a re-launch of the virtual machine instance 112. If the particular dedicated server 108 has sufficient capacity and has not been allocated to other customers, the management sub-system 114 may re-launch the virtual machine instance 112 within this particular dedicated server 108.

If the particular dedicated server 108 is no longer available (e.g., insufficient capacity or has been consumed by another customer), the management sub-system 114 may access the server data store 116 to identify another server (e.g., another dedicated server reserved by the customer 102 or within the pool of dedicated servers 108 or another server from the pool of other servers 110 that can be dedicated for the customer 102) that can be used to re-launch the virtual machine instance 112. If the virtual machine instance 112 requires, based at least in part on the operating system volume license, that it be re-launched in the same dedicated server 108, the management sub-system 114 may deny the customer's 102 request to re-launch the virtual machine instance 112 onto a different dedicated server 108, as re-launching the virtual machine instance 112 using different hardware may constitute additional use of the license.

Once a dedicated server 108 has been assigned to a customer 102 for his/her own use, no other customer 104 (e.g., Customer 2) may be allowed to utilize this dedicated server 108. For instance, as illustrated in FIG. 1, if a second customer 104 attempts to launch a virtual machine instance 112 within a dedicated server 108 allocated to a first customer 102, the management sub-system 114 may deny the second customer's 104 request. Thus, when the second customer 104 attempts to launch a virtual machine instance 112 using a dedicated server 108, the management sub-system 114 may access the server data store 116 to identify a dedicated server 108 distinct from any dedicated server 108 allocated to, or reserved by, another customer 102. Further, if this second customer 104 requests, to an "AcquireServer" API, reservation of one or more dedicated servers 108, the management sub-system 114 may remove from consideration any dedicated servers 108 already allocated to, or reserved by, another customer 102.

In some embodiments, the customer 102 may delegate access to the available capacity within the dedicated server 108 to other customers 104 or other users. For instance, the customer 102 may configure the dedicated server 108 to allow particular users to access and utilize the available capacity within the dedicated server 108 for other virtual machine instances. Thus, when another user utilizes his/her set of credentials to launch a virtual machine instance within the dedicated server 108, the virtual computer system service 106 may determine whether the particular user is authorized to do so on behalf of the customer 102 by virtue of the customer's delegation of authority to this user. In this manner, a customer with a dedicated server can use capacity of the dedicated server for other customers while gaining fine-grained control over which other customers can utilize the capacity.

In an embodiment, the customer 102 can submit a request to the management sub-system 114 to create a capacity group comprising one or more dedicated servers 108 for the customer's 102 exclusive use and identifiable in API calls for the purpose of performing operations in connection with the group. For instance, through an interface provided by the virtual computer system service 106, the customer 102 may submit a web service request to a "CreateCapacityGroup" API to create the capacity group. Fulfillment of the "CreateCapacityGroup" API may cause an identifier to be assigned for the capacity group. Once the management sub-system 114 has created the capacity group on behalf of the customer 102, the customer 102 may submit a second web service request to an "AssociateCapacityGroup" API to associate one or more dedicated servers 108 to the capacity group, where a parameter of the request may specify identifiers of the servers or otherwise specify servers (e.g., by specifying an identifier of a different existing capacity group). In response to this request, the management sub-system 114 may access the server database within the server data store 116 to specify, for each of the one or more dedicated servers 108 specified by the customer 102 within the request, that the dedicated server 108 is associated with the capacity group. This may include modifying a dedicated server entry within the server database to include a capacity group identifier for the selected capacity group. Note that, in alternate embodiments, a single request may be used to both create the capacity group and place existing servers into the group.

The customer 102, through the interface, may submit a web service request to a "RunInstance" API to launch a virtual machine instance within a particular capacity group. A parameter of the request may include an identifier of the capacity group. If the virtual machine instance to be launched is a new virtual machine instance, the management sub-system 114 may access the server database within the server data store 116 to determine whether the dedicated servers 108 within the specified capacity group have sufficient capacity to support the virtual machine instance. If the specified capacity group does not have sufficient capacity to support the virtual machine instance, the management sub-system 114 may not launch the virtual machine instance and return an error message that may be provided to the customer 102 through the interface. If the capacity group does have sufficient capacity to support the virtual machine instance, the management sub-system 114 may select a dedicated server 108 within the capacity group that has sufficient capacity to support the virtual machine instance and has the "AutoPlacement" parameter set to "TRUE."

Once a virtual machine instance has been launched within a capacity group, the management sub-system 114 may generate a server affinity identifier for the virtual machine instance, which may be used to determine where the virtual machine instance may be launched in the event the instance is stopped and re-launched at a later time. For instance, if the virtual machine instance is launched within a capacity group, the management sub-system 114 may generate a server affinity identifier for the instance that is set to "GROUP." This may signify that the virtual machine instance may only be operated within the particular capacity group it was originally launched in. Thus, if the customer 102 attempts to re-launch the virtual machine instance within another capacity group or the original capacity group does not have sufficient capacity to support the virtual machine instance, the management sub-system 114 may deny the customer's 102 request to re-launch the virtual machine instance.

At any time, the customer 102 may submit a web service request to a "ModifyInstanceAtribute" API to modify the host affinity identifier for a particular virtual machine instance. For example, the customer 102 may request modification of the identifier to specify that the virtual machine instance may be launched within any dedicated server 108 within the capacity group hierarchy. The management sub-system 114, in response to the request, may modify the server affinity identifier for the virtual machine instance from "GROUP" to "SHARED." This may serve to indicate that the virtual machine instance may be launched within any dedicated server 108 within the capacity group hierarchy. For instance, if the customer 102 stops the virtual machine instance and wishes to re-launch the virtual machine instance within the original capacity group, the management sub-system 114 may determine whether the original capacity group has sufficient capacity to support the virtual machine instance. If the original capacity group does not have sufficient capacity, the management sub-system 114 may evaluate the server affinity identifier for the virtual machine instance to determine whether the virtual machine instance must be launched within the specified capacity group. If the specified capacity group does not have sufficient capacity for the virtual machine instance and the server affinity identifier is set to "GROUP," the management sub-system 114 may deny the request to re-launch the virtual machine instance. However, if the identifier is set to "SHARED," the management sub-system 114 may identify a parent capacity group within the capacity group hierarchy and determine whether this parent capacity group has sufficient capacity for the virtual machine instance. If the parent capacity group has capacity available for the instance, the management sub-system 114 may launch the virtual machine instance within this parent capacity group.

Figure 2:
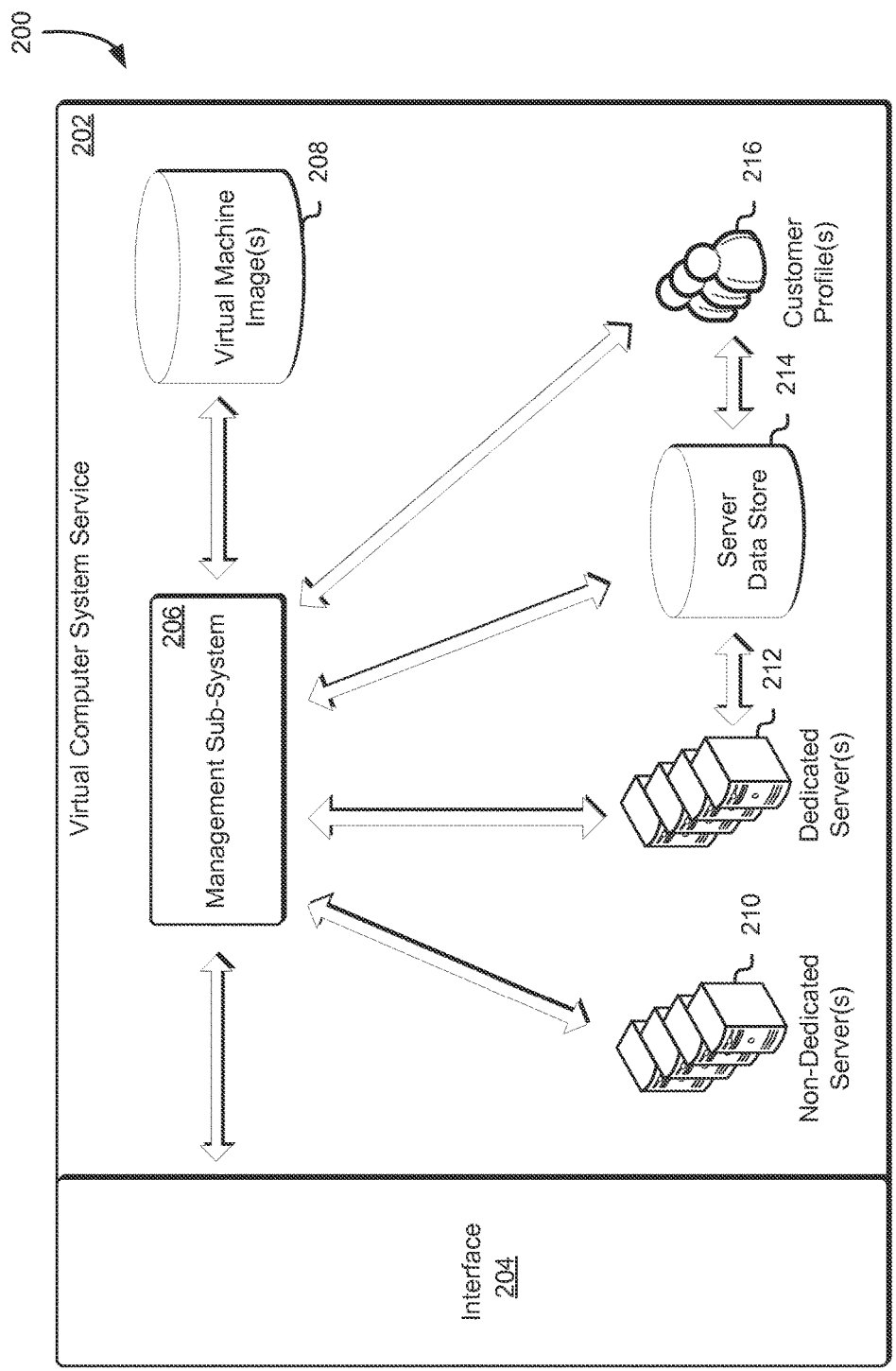
FIG. 2 shows an illustrative example of an environment in which one or more virtual machine images are instantiated within one or more dedicated servers upon customer request in accordance with at least one embodiment.

As noted above, a customer may interact with a virtual computer system service to request reservation of one or more dedicated servers and launch of a virtual machine instance within one of these dedicated servers or within a dedicated server provisioned to the customer on-demand. Accordingly, FIG. 2 shows an illustrative example of an environment 200 in which one or more virtual machine images 208 are instantiated within one or more dedicated servers 212 upon customer request in accordance with at least one embodiment. The virtual computer system service 202 may provide customers with a customer interface 204 that may enable a customer to access the virtual computer system service 202. A customer may utilize the customer interface 204 through one or more communications networks, such as the Internet. The customer interface 204 may contain certain security safeguards to ensure that the customer has authorization to access the virtual computer system service 202. For instance, in order to access the virtual computer system service 202, a customer may need to provide a username and a corresponding password or encryption key when using the customer interface 204. Additionally, requests (e.g., API calls) submitted to the customer interface 204 may require an electronic signature generated using a cryptographic key such that the electronic signature is verifiable by the virtual computer system service 202, such as by an authorization system (not shown).

Once the customer has gained access to the virtual computer system service 202 through the customer interface 204, the virtual computer system service 202 may allow the customer to interact, through the customer interface 204, with a management sub-system 206. For instance, the management sub-system 206 may enable a customer to remotely provision a virtual machine instance. A customer may use the customer interface 204 and the management sub-system 206 to generate a virtual machine instance that includes an operating system and a variety of applications suited to the customer's needs. The operating system and the various applications may be maintained in data storage in the form of machine images 208. The virtual computer system service 202 may maintain a variety of machine images 208 based on specific customer preferences, as specified in the management sub-system 206. When a customer submits a request for provisioning a virtual machine instance through the management sub-system 206, the virtual computer system service 202 may identify the machine image the customer has requested and allocate the resources necessary (e.g., the processors and random-access memory (RAM) required to operate the components of the machine image) to process the machine image. The machine image may be instantiated on one or more servers (e.g., non-dedicated servers 210 or dedicated servers 212) that may act as a physical host for the instance.

In an embodiment, a customer, through the customer interface 204, submits a request to the virtual computer system service 202 to provision and reserve one or more dedicated servers for his/her virtual machine instances. This request may be submitted through an "AcquireServer" web service or other API call to the service 202 and may include various parameters such as an account identifier for the customer, virtual machine instance types, information such as a number of processors, amount of memory amount of networking capacity, etc. Additionally, if the customer wishes to reserve a dedicated server, the request may be submitted through a "PurchaseReservedServer" web service or other API call to the service 202. In response to the request, the management sub-system 206 may access a server data store 214 to identify, from a pool of dedicated servers 212 not allocated to any other customers, the one or more dedicated servers that may be reserved for the customer to fulfill his/her request. In some embodiments, the virtual computer system service 202 may maintain a general pool of non-dedicated servers 210 that the management sub-system 206 may utilize to identify one or more servers that may be dedicated to the customer for his/her sole use. Once the management sub-system 206 has identified the one or more servers to be dedicated to the customer, the management sub-system 206 may access the server data store 214 to specify, within a database, which servers have been reserved for the exclusive use of the customer. Additionally, the management sub-system 206 may access a customer profile 216 associated with the customer to specify that this customer has access to these newly dedicated servers 212. The server database 214 may specify a plurality of dedications, which may indicate which dedicated servers 212 are allocated to each customer of the virtual computer system service 202. In some embodiments, the management sub-system 206 generates a reservation identifier for each dedication such as a randomly-generated alphanumeric value, a value that relates to the characteristics of the customer that has submitted the request to create the reservation (e.g., Bob's first reservation), a value that relates to the characteristics of the reserved dedicated server (e.g., Instance Type ABC reservation), a sequence number, or a sequence number or other value that has been obfuscated (e.g., through encryption). This reservation identifier may be stored within the database in association with an identifier used by the service 202 to identify the dedicated server 212. Further, the management sub-system 206 may provide this reservation identifier to the customer.

Once one or more dedicated servers 212 have been reserved for the customer, the customer, through the interface 204, may submit a request (e.g., "RunInstances" web service or other API call) to the virtual computer system service 202 to instantiate one or more virtual machine images 208 onto one of these dedicated servers 212. For instance, in an embodiment, the customer, through the interface 204, submits a request to the management sub-system 206 (e.g., "DescribeServers" web service or other API call) to obtain a server identifier for each dedicated server 212 reserved for the customer or otherwise being utilized by the customer. Once the customer has obtained these one or more server identifiers from the management sub-system 206, the customer may generate a request that may include a server identifier corresponding to the dedicated server 212 that should be used for instantiating the virtual machine image 208. In response to the request, the management sub-system 206 may access the server data store 214 to determine if the identified server has been dedicated to a particular customer. If so, the management sub-system 206 may access the customer's profile 216 to determine if this particular customer is authorized to use the dedicated server 212 for instantiating a virtual machine image 208. If so, the management sub-system 206 may instantiate the virtual machine image 208 on the selected dedicated server 212, if the dedicated server 212 has sufficient capacity to support the virtual machine instance. In some embodiments, the management sub-system 206 may include a placement server, which may be configured to select from the plurality of dedicated servers 212 a dedicated server for the virtual machine instance in a manner that respects the plurality of dedications in the server data store 214.

In an embodiment, each dedicated server 212 allocated to the customer includes an "AutoPlacement" parameter, which, when set to "TRUE," may enable the management sub-system 206 to automatically run a virtual machine instance within the dedicated server 212. The customer, through the interface 204, may change, through use of the "ModifyServerAttribute" web service or other API, the "AutoPlacement" parameter of a dedicated server 212 to "FALSE" to prevent the management sub-system 206 from automatically running a virtual machine instance within the dedicated server 212, thus requiring the customer to specify that the virtual machine instance is to be run from this dedicated server 212. If the customer does not select a server identifier through the interface 204 when submitting a request to run a virtual machine instance, the management sub-system 206 may identify any dedicated servers 212 allocated for the customer that have the "AutoPlacement" parameter set to "TRUE" and automatically select any of these identified dedicated servers 212 for running the virtual machine instance.

If the customer has not previously reserved a dedicated server 212 or the customer's selected dedicated server 212 does not have sufficient capacity to support the virtual machine instance, the management sub-system 206 may access the server data store 214 to identify, from the pool of dedicated servers 212 and/or non-dedicated servers 210, any servers that have not been allocated to another customer and that can be used to instantiate the virtual machine image 208. If the management sub-system 206 is able to identify at least one server that can be used to instantiate the virtual machine image 208, the management sub-system 206 may allocate the identified server to the customer on-demand and instantiate the virtual machine image 208. Additionally, the management sub-system 206 may update the server data store 214 and the customer's profile 216 to specify that the identified dedicated server 212 has been allocated to the customer on-demand. The management sub-system 206 may further generate a reservation identifier for the identified server and provide this identifier to the customer for future use.

At any time, a customer may submit a request, through the interface 204, to release one or more dedicated servers 212 allocated for the customer's use. For instance, the customer may submit a "ReleaseServer" web service or other API call, through the interface 204, to the management sub-system 206 to release the one or more dedicated servers 212. In response to the request, the management sub-system 206 may stop any virtual machine instances operating within these one or more dedicated servers 212 and specify, within the server data store 214, that these dedicated servers 212 are once again available for allocation, either as a dedicated server 212 for another customer or as a non-dedicated server 210 for use by a variety of customers simultaneously. Alternatively, if these one or more dedicated servers 212 have been reserved for the customer, the management sub-system 206 may stop the virtual machine instances and enable allocation of the customer's other resources within these dedicated servers 212. The management sub-system 206 may further access the customer's profile 216 to specify the identifiers for the released dedicated servers 212 and the corresponding virtual machine instances previously operating within these dedicated servers 212.

In an embodiment, each dedicated server 212 includes an "AutoRelease" parameter, which may be utilized to specify whether a dedicated server 212 is to be released automatically in the event that the customer stops or otherwise terminates all virtual machine instances on the dedicated server 212. For instance, if the "AutoRelease" parameter is set to "TRUE" for a dedicated server 212, the management sub-system 206 may automatically release this dedicated server 212 upon determination that there are no virtual machine instances running on the dedicated server 212. For instance, if the "AutoRelease" parameter is set to "TRUE" and the dedicated server 212 has no running virtual machine instances, the management sub-system 206 may remove a reservation identifier from dedicated server 212 entry within the server database (if provisioned on-demand) and enable other customers to utilize the dedicated server 212. Alternatively, if the dedicated server 212 has been reserved for the customer, the management sub-system 206 may maintain the reservation identifier, thus enabling the customer to continue exclusive use of the dedicated server 212. However, if the "AutoRelease" parameter for the dedicated server 212 is set to "FALSE," the customer would be required to submit a request, through the interface 204, to release the dedicated server 212. This may include using the "ReleaseServer" API, as described above. In order to modify the "AutoRelease" parameter for a dedicated server 212, the customer may utilize the "ModifyServerAttribute" web service or other API, as described above, to toggle the parameter from "TRUE" to "FALSE" and vice versa.

Through the interface 204, the customer may later submit a request to re-launch a stopped virtual machine instance on a dedicated server 212. In response to the request, the management sub-system 206 may access the customer's profile 216 to determine which dedicated server 212 was utilized to operate the virtual machine instance. Subsequently, the management sub-system 206 may access the server database 214 to determine whether the dedicated server 212 utilized to operate the virtual machine instance is still available for use. For instance, if the dedicated server 212 was allocated to the customer on-demand, the management sub-system 206 may locate the server and determine whether it is still available for dedicated use and if it has sufficient capacity to support the virtual machine instance. If the server is not available for dedicated use or has insufficient capacity to support the virtual machine instance, the management sub-system 206 may identify a new dedicated server 212 that may be allocated to the customer and is capable of supporting the virtual machine instance.

If the dedicated server 212 was reserved for the customer, the management sub-system 206 may determine whether the reserved dedicated server 212 has the available capacity for the virtual machine instance. If so, the management sub-system 206 may launch the virtual machine instance within this dedicated server 212. Otherwise, the management sub-system 206 may access the server database to determine whether any other dedicated servers 212 have been reserved for the customer. If so, the management sub-system 206 may identify a different reserved dedicated server 212 that has sufficient capacity for the virtual machine instance. For instance, in some embodiments, the management sub-system 206 may identify any reserved dedicated servers 212 with the "AutoPlacement" parameter set to "TRUE." These identified dedicated servers 212 may be utilized for automatic placement of a virtual machine instance. If no other reserved dedicated servers 212 are available, the management sub-system 206 may provision a new dedicated server 212 from the pool of available dedicated servers 212 and/or non-dedicated servers 210.

Figure 3:
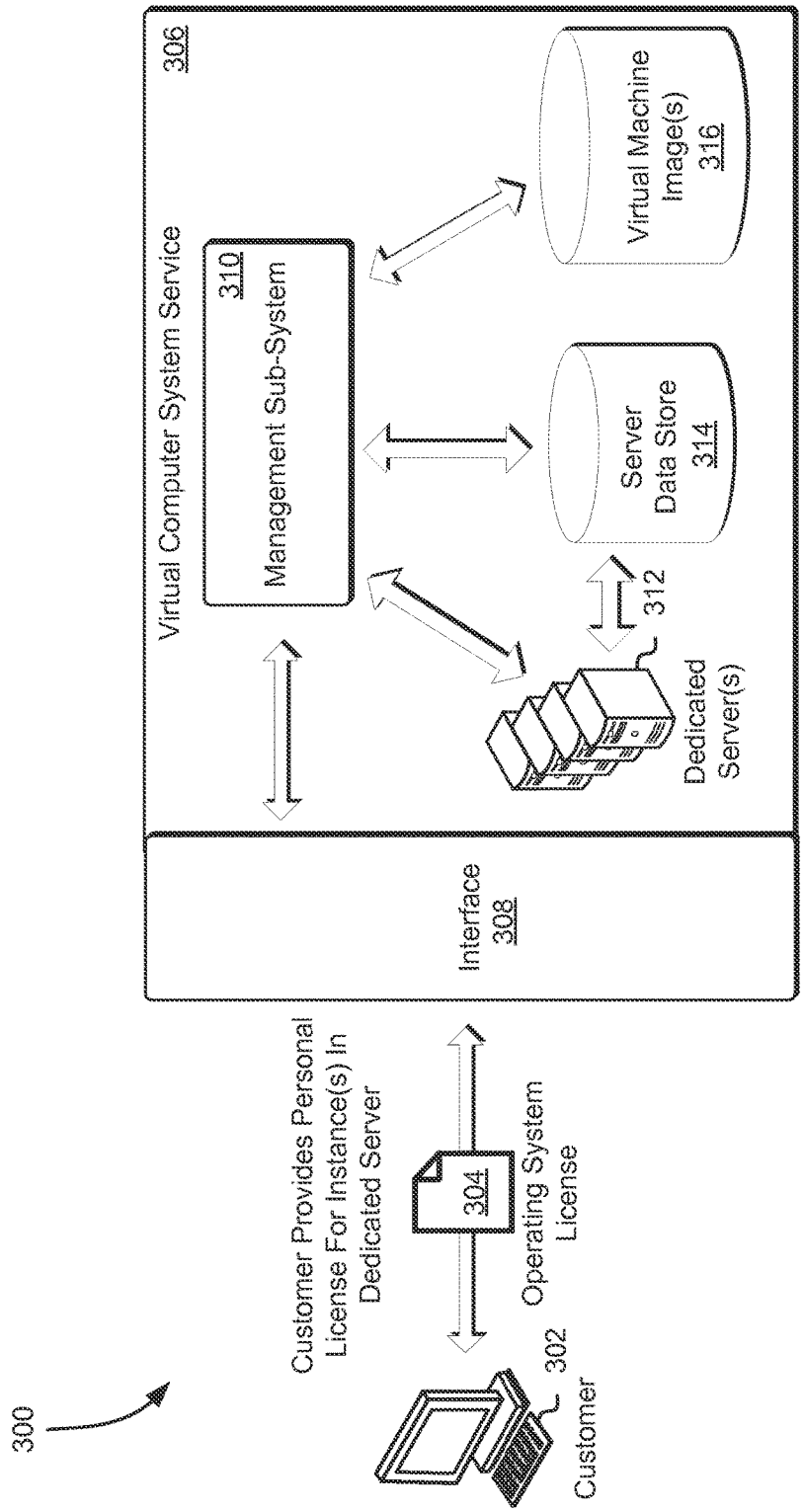
FIG. 3 shows an illustrative example of an environment in which a customer provides one or more operating system licenses for instantiating one or more virtual machine images in a dedicated server in accordance with at least one embodiment.

As noted above, a customer may provide an operating system volume license to the virtual computer system service, which may be used to launch one or more virtual machine instances in a dedicated server. The operating system volume license may enable the customer to launch and maintain virtual machine instances in a single dedicated server, utilizing the same hardware for these instances. This may reduce the allocation cost of the customer's virtual machine instances, as the customer may not be required to report and account for an additional license use. Accordingly, FIG. 3 shows an illustrative example of an environment 300 in which a customer 302 provides one or more operating system licenses 304 for instantiating one or more virtual machine images 316 in a dedicated server 312 in accordance with at least one embodiment. In the environment 300, the customer 302, through one or more associated computing devices or clients, may access the virtual computer system service 306 using an interface 308. Through the interface 308, the customer 302 may request, such as through a "PurchaseReservedServer" web service or other API call to the service 306, that one or more dedicated servers 312 be reserved for his/her own purposes. As noted above, in response to this request, the management sub-system 310 may access a server data store 314 to identify one or more dedicated servers 312 that may be used to fulfill the customer's reservation request and specify, within a server database within the data store 314, that these one or more dedicated servers 312 are reserved for the customer 302.

Additionally, the customer 302, through the interface 308, may select one or more virtual machine images 316 that may be instantiated in one or more of the customer's 302 reserved dedicated servers 312 or on an on-demand dedicated server 312 (e.g., through use of the "AcquireServer" web service or other API) if the customer 302 has not previously reserved a dedicated service 312 for his/her exclusive use. The selected one or more virtual machine images 316 may require that the customer 302 provide his/her own operating system volume license 304 in order to enable instantiation of these one or more virtual machine images 316 on a dedicated server 312. The operating system volume license 304 may require the customer 302 to pay for each use of the license resulting from the instantiation of a virtual machine image 316 onto a dedicated server 312. Thus, for each distinct dedicated server 312 used to instantiate the virtual machine image 316, the customer 302 may be required to pay an additional use fee under the terms of the operating system volume license 304.

Once the customer 302 has provided the operating system volume license 304 to the virtual computer system service 306 through the interface 308, the management sub-system 310 may update the server database within the server data store 314 to specify the operating system volume license 304 attached to the one or more virtual machine images 316 instantiated in a dedicated server 312. Additionally, as described above, the management sub-system may record this license 304 within the customer's profile for later verification of the customer's 302 authority to launch virtual machine images 316 associated with the operating system volume license 304. The management sub-system 310, upon verifying the validity of the operating system volume license 304, may obtain the selected one or more virtual machine images 316 and instantiate these virtual machine images 316 in one or more dedicated servers 312. The one or more dedicated servers 312 may be selected by the customer 302 through the interface 308, if previously reserved, or automatically provisioned to the customer 302 on-demand. In some embodiments, if the customer 302 does not specify a particular dedicated server 312 for the virtual machine instance, the management sub-system 310 may access the server data store 314 to identify any reserved dedicated servers 312 that may have their "AutoPlacement" parameter set to "TRUE." If the "AutoPlacement" parameter for a dedicated server 312 is set to "TRUE," the management sub-system 310 may automatically instantiate a virtual machine image within the dedicated server 312. Alternatively, if the parameter is set to "FALSE," the customer 302 may be required to select the dedicated server 312 through the interface 308 in order for the management sub-system 310 to instantiate the virtual machine image within the dedicated server 312. If the one or more dedicated servers 312 are provisioned on-demand, the management sub-system 310 may specify, within the server database 314 that these dedicated servers 312 have been allocated for exclusive use by the customer 302.

In some embodiments, the management sub-system 310 may transmit the operating system license 304 to a third-party server (e.g., a server managed and operated by the operating system provider, an authentication server within the customer's 302 on-premises network, etc.) to determine whether the provided operating system license 304 is valid. The management sub-system 310 may receive, from this third-party server, a notification specifying whether the operating system license 304 is valid or not. If the operating system license 304 is not valid, the management sub-system 310 may deny the customer's 302 request to instantiate the one or more virtual machine images 316 onto a dedicated server 312. However, if the operating system license 304 is valid, the management sub-system 310 may obtain the selected one or more virtual machine images 316 and instantiate these virtual machine images 316 in the one or more dedicated servers 312.

In an alternative embodiment, the customer 302 is required to activate the virtual machine instance on the dedicated server 312 using his/her operating system license 304. For instance, when a virtual machine image 316 is instantiated onto one or more dedicated servers 312, a product key may be installed onto the one or more dedicated servers 312. This product key may be obtained from one or more servers operated by the operating system or virtual machine image 316 provider. Alternatively, this product key may be generated automatically upon instantiation of the virtual machine image 316. In order to make use of the virtual machine instance on the one or more dedicated servers 312, the customer 302 may transmit his/her operating system license 304, along with the product key, to the virtual machine image 316 provider for validation. Accordingly, the provider may determine whether the provided operating system license 304 is valid and, if so, account for the activation against this license 304. For example, the customer 302, by virtue of the operating system license 304, may be entitled to activate a particular number of virtual machine images 316. When this limit is reached, the customer 302 may be required to obtain an additional license 304 or request (e.g., through payment, etc.) additional activations through the license 304. Otherwise, the virtual machine image 316 provider may deny the customer's 302 request to activate the virtual machine instance.

At any time, the customer 302 may request that the one or more virtual machine instances operating within his/her dedicated servers 312 be stopped or that the dedicated servers 312 be released. For example, the customer 302 may submit, through the interface 308, a "StopInstances" web service or other API call to the management sub-system 310 to stop one or more virtual machine instances in any dedicated server 312. The customer 302 may further submit, through the interface 308, a "ReleaseServer" web service or other API call to the management sub-system 310 to request release of one or more dedicated servers 312. In response to such requests, the management sub-system 310 may access a database within the server data store 314 to record which one or more dedicated servers 312 are associated with these stopped virtual machine instances. If the one or more dedicated servers 312 are reserved for the customer 302, the management sub-system 310 may maintain the reservation for the customer 302 for his/her later use. However, if the one or more dedicated servers 312 were provided to the customer 302 on-demand in response to his/her request to instantiate a virtual machine image 316 within a dedicated server 312 without a prior reservation, the management sub-system 310 may release the one or more dedicated servers 312 and enable other customers to reserve these one or more dedicated servers 312 or otherwise use these released dedicated servers 312 for any of myriad purposes. The management sub-system 310 may additionally access the server data store 314 to specify that these one or more dedicated servers 312 have been released. However, the management sub-system 310 may still specify that the stopped virtual machine instances were originally operating within these one or more dedicated servers 312.

As noted above, in some embodiments, each dedicated server 312 may include an "AutoRelease" parameter, which may be utilized to specify whether a dedicated server 312 is to be released automatically in the event that the customer 302 stops or otherwise terminates all virtual machine instances on the dedicated server 312. For instance, if the "AutoRelease" parameter is set to "TRUE" for a dedicated server 312, the management sub-system 310 may automatically release this dedicated server 312 upon determination that there are no virtual machine instances running on the dedicated server 312. For instance, if the "AutoRelease" parameter is set to "TRUE" and the dedicated server 312 has no running virtual machine instances, the management sub-system 310 may remove a reservation identifier from dedicated server 212 entry within the server database (if provisioned on-demand) and enable other customers to utilize the dedicated server 312. Alternatively, if the dedicated server 312 has been reserved for the customer, the management sub-system 310 may maintain the reservation identifier, thus enabling the customer to continue exclusive use of the dedicated server 312. However, if the "AutoRelease" parameter for the dedicated server 312 is set to "FALSE," the customer would be required to submit a request, through the interface 308, to release the dedicated server 312. This may include using the "ReleaseServer" web service or other API, as described above. In order to modify the "AutoRelease"

parameter for a dedicated server 312, the customer may utilize the "ModifyServerAttribute" web service or other API, as described above, to toggle the parameter from "TRUE" to "FALSE" and vice versa.

In the event that the customer 302 submits a request to re-launch a virtual machine instance on a dedicated server 312, the management sub-system 310 may access the server database 314 to determine whether the particular virtual machine instance is associated with the customer's operating system volume license 304. Additionally, the management sub-system 310 may identify, through the database in the server data store 314, the one or more dedicated servers 312 previously used for operation of the virtual machine instance. The management sub-system 310, based at least in part on this information, may determine whether the identified one or more dedicated servers 312 have sufficient capacity for operating the virtual machine instance and the one or more dedicated servers 312 have not been allocated to another customer.

If the one or more dedicated servers 312 have been reallocated to another customer or do not have the sufficient capacity to support the virtual machine instance, and the virtual machine instance is subject to an operating system volume license 304, the management sub-system 310 may deny the customer's 302 request to re-launch the virtual machine instance until the one or more dedicated servers 312 become available again and/or have sufficient capacity for supporting the virtual machine instance. Alternatively, the management sub-system 310, through the interface 308, may inform the customer 302 enable the customer 302 to request provisioning of a new dedicated server 312 for the virtual machine instance in exchange for paying the additional license see for utilizing the virtual machine instance on different hardware. In some embodiments, when the customer 302 requests provisioning of a new dedicated server 312 for the virtual machine instance, he/she may receive a new product key corresponding to the virtual machine instance, which the customer 302 may need to provide along with the operating system license 304 to the virtual machine image 316 provider (e.g., third-party provider of operating systems, etc.) to activate the virtual machine instance.

Figure 4:
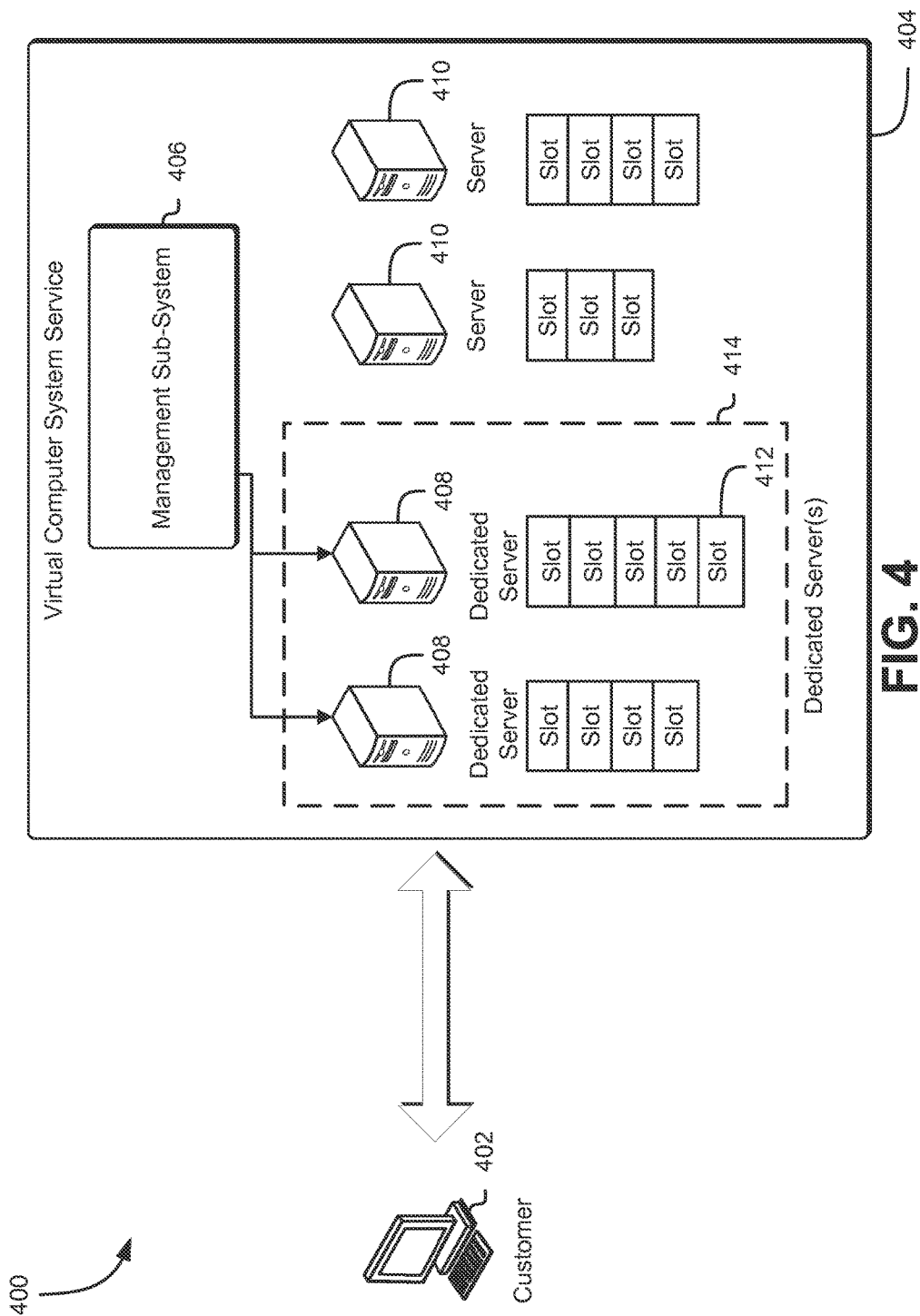
FIG. 4 shows an illustrative example of an environment in which one or more virtual machine images are instantiated in one or more dedicated server slots in accordance with at least one embodiment.

As noted above, a customer may request provisioning of one or more dedicated servers for his/her purposes, including instantiation of one or more virtual machine images. Each dedicated server may comprise a plurality of slots that may be used to instantiate a virtual machine image. Accordingly, FIG. 4 shows an illustrative example of an environment 400 in which one or more virtual machine images are instantiated in one or more dedicated server slots 412 in accordance with at least one embodiment. In the environment 400, a customer 402 may interact with a virtual computer system service 404 by submitting one or more requests, such as through one or more API calls to the service 404 as described above, through one or more communications networks, such as the Internet. As noted above, the customer 402 may utilize a customer interface and a management sub-system 406, provided by the virtual computer system service 404, to generate an instance that includes an operating system and a variety of applications suited to the customer's needs.

The management sub-system 406, as noted above, may interact with one or more servers 408, 410 to instantiate a virtual machine instance by installing a machine image into one or more servers 408, 410, dependent on the customer 402 request. Each server 408, 410 may comprise a set of resources necessary to instantiate a virtual machine instance. However, each server 408, 410 may include different sets of resources based on the hardware components included in the servers 408, 410. For instance, each server 408, 410 may comprise different processing chip sets, storage devices (e.g. solid-state drives or magnetic disk drives) or RAM necessary to instantiate one or more virtual machine instances. Accordingly, certain virtual machine instances may be instantiated in some servers 408, 410 but not others.

Each server 408, 410 may comprise one or more slots 412 for the allocation of a virtual machine instance. Each slot 412 may represent an allocation of a set of resources from the server 408, 410 for performing one or more operations in support of the virtual machine instance. For instance, a slot may represent half of the processing capabilities of a server 408, 410. When a customer 402 requests creation of a virtual machine instance, the customer 402 may be able to specify how large the virtual machine instance should be. Accordingly, the larger a virtual machine instance is, the more slots 412 the instance may consume in a server 408, 410 since a large instance may require additional resources to instantiate and support the machine image (e.g., operating system and associated applications) that is part of the virtual machine instance. If a server 408, 410 comprises fewer computing resources (e.g., uses older technology such as outdated or obsolete processors and/or storage devices), the server 408, 410 may only include a small number of slots 412 for allocation of a virtual machine instance. Alternatively, a newer server 408, 410, with greater computing resources, may be able to support additional slots 412 and thus accommodate additional virtual machine instances.

Thus, when a customer 402 submits a request to create a virtual machine instance to the virtual computer system service 404, the management sub-system 406 may be configured to access a database within a server data store to determine which servers 408, 410 comprise the necessary resources to instantiate the instance. Additionally, the management sub-system 406 may determine, of these servers 408, 410, which server 408, 410 comprises the necessary slots 412 for allocation. Accordingly, the management sub-system 406 may instantiate the virtual machine instance into a server 408, 410 with the resources and slots 412 necessary to support the instance.

As noted above, a customer 402 may submit a request to the virtual computer system service 404, such as through a "PurchaseReservedServer" web service or other API call to the service 404, to reserve and provision one or more dedicated servers 408 that may be used for the customer's 402 exclusive use. The customer 402 may specify the desired hardware configuration (e.g., number of slots, available capacity, etc.) for these dedicated servers 408, which may be added to the customer's 402 dedicated server pool 414 for instantiation of one or more virtual machine images. For instance, the customer 402 may specify, for each dedicated server 408 that is to be added to the customer's dedicated server pool 414, the number of slots 412 that are to made available for his/her use, the size (e.g., capacity, hardware allocation, etc.) for each of these slots 412, the available bandwidth for these slots 412 and the like. The management sub-system 406 may identify, from the available servers 408, 410 (e.g., non-dedicated servers and dedicated servers that have not been allocated to another customer), one or more servers that satisfy the customer's 402 criteria and may add these servers to the customer's dedicated server pool 414.

In some embodiments, the customer 402 may reconfigure each dedicated server 408 within his/her dedicated server pool 414 at any time. For instance, if a dedicated server 408 has no virtual machine instances operating within it, the customer 402 may transmit a request to the management sub-system 406, such as through one or more API calls (e.g., a "ModifyReservedServers" web service or other API call) to the management sub-system 406, to reconfigure the number of slots 412 within the dedicated server 408 as needed. For example, through an interface provided by the virtual computer system service 404, the customer 402 may configure his/her dedicated servers 408 and corresponding slots 412 to satisfy his/her needs (e.g., number of slots, processing capabilities for each slot, available storage capacity for each slot, etc.). Subsequently, the management sub-system 406 may receive this request from the customer 402 and configure the dedicated servers 408 as needed. In an alternative embodiment, the customer 402 is provided with direct, administrative control over his/her dedicated servers 408 within the dedicated server pool 414. The customer 402, under such circumstances, may access the dedicated servers 408 directly and configure these dedicated servers 408 himself/herself through modification of a configuration file to specify how the slots 412 are configured. In some embodiments, the customer 402 can reconfigure any unused slots 412 within a dedicated server 408 even if one or more slots 412 are currently in use for virtual machine instances. Under such circumstances, the management sub-system 406 may ensure that any reconfiguring of the dedicated server 408 satisfies the hardware capabilities of the dedicated server 408 and does not negatively impact any operating instances.

In an embodiment, the customer 402 can specify certain proximity parameters that are to be used to provision the one or more dedicated servers 408 that are to be added to the customer's dedicated server pool 414. For instance, a customer 402 may specify, through one or more API calls to the management sub-system 406, that the one or more dedicated servers 408 are to be separated from one another (e.g., different server rack, different datacenter room, different datacenters, different regions, etc.) in order to prevent correlated failures. For example, through use of the "ModifyReservedServers" web service or other API, the customer 402 may specify a desired location or data zone for each dedicated server 408 within the customer's dedicated server pool 414. This may result in generation of a new reservation identifier for each dedicated server 408 modified in this manner. Alternatively, in order to reduce network latency, the customer 402 may specify that the one or more dedicated servers 408 are to be in relative proximity to one another (e.g., same server rack, same datacenter room, etc.). In some embodiments, the management sub-system 406 may automatically select the dedicated servers 408 according to its own placement rules if the customer 402 does not provide any parameters for selection of the one or more dedicated servers 408. For instance, the management sub-system 406 may be configured to identify any reserved dedicated servers 408 within the customer's dedicated server pool 414 to determine the physical location of these dedicated servers 408. Subsequently, the management sub-system 406 may utilize a placement algorithm to identify a dedicated server 408 that may fulfill the customer's request for a new dedicated server 408 and satisfies one or more criteria for preventing correlated failures. In some embodiments, the management sub-system 406 may attempt to utilize the customer's preferences for allocation of the dedicated server 408 and, if such allocation is not possible, utilize its own algorithm to identify the dedicated server 408 for allocation to the customer 402.

When the customer 402 submits a request to the virtual computer system service 404 to instantiate one or more virtual machine images onto a dedicated server 408, the customer 402 may specify which particular reserved dedicated server 408 may receive the virtual machine instance. The management sub-system 406 may access the database within the server data store to determine whether the selected dedicated server 408 within the dedicated server pool 414 has enough slots 412 available for instantiating the one or more virtual machine images. If the selected dedicated server 408 does not have sufficient slots 412 available to support the virtual machine instance, the management sub-system 406 may determine whether any other dedicated servers 408 within the customer's dedicated server pool 414 comprise sufficient slots 412 to support the virtual machine instance. If so, the virtual machine instance may be launched through the identified dedicated server 408. However, if no dedicated server 408 within the customer's dedicated server pool 414 has sufficient capacity to support the requested virtual machine instance, the management sub-system 406 may identify, from the database within the server data store, any available servers 410 outside of the customer's dedicated server pool 414 that can be dedicated to the customer 402, a server 410 that may be used to instantiate the virtual machine image. This server 410 may subsequently be added to the customer's dedicated server pool 414.

If the customer 402 wishes to re-launch a stopped virtual machine instance at a later time, the management sub-system 406 may identify which dedicated server 408 was utilized for the virtual machine instance and determine whether this dedicated server 408 has sufficient slot 412 capacity to support the virtual machine instance. Further, the management sub-system 406 may determine whether this dedicated server 408 has been allocated for another customer, released from the customer's dedicated server pool 414, or is still available within the customer's dedicated server pool 414. If the previously used dedicated server 408 is available, the management sub-system 406 may allocate the dedicated server 408 to the customer's dedicated server pool 414 (if not already within the pool) and re-launch the virtual machine instance in the dedicated server 408. Otherwise, the management sub-system 406 may identify a new server 408, 410 that may be allocated to the customer and used to re-launch the virtual machine instance. The management sub-system 406 may select a server 408, 410 that has a number of slots 412 approximately equal to the number of slots 412 included within the original dedicated server 408. The selected server 408, 410 may be added to the dedicated server pool 414 for the customer 402.

Figure 5:
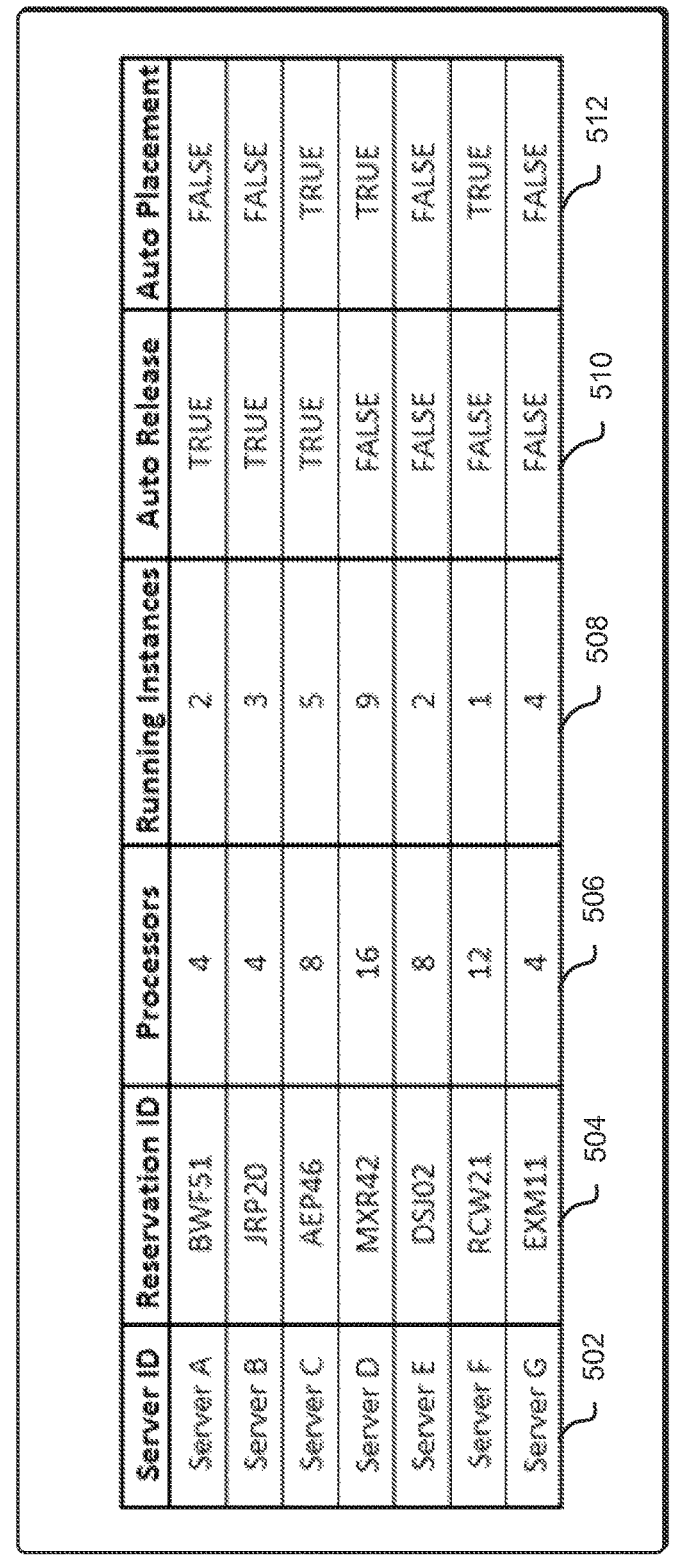
FIG. 5 shows an illustrative example of a database comprising information for one or more servers provided by the virtual computer system service in accordance with at least one embodiment.

As noted above, the server data store of the virtual computer system service may include a database, which may include a description of the various servers maintained by the virtual computer system service. Each server entry within the database may specify whether the corresponding server may, for instance, be automatically released in the event that there are no running virtual machine instances within the server. Further, the server entry may specify whether the management sub-system of the virtual computer system service may automatically place virtual machine instances within the server upon customer request for starting a virtual machine instance. Accordingly, FIG. 5 shows an illustrative example of a database 500 comprising information for one or more servers provided by the virtual computer system service in accordance with at least one embodiment.

The database 500 may include one or more columns that may be used to describe each server operated and maintained by the virtual computer system service. For instance, the database 500 may include a server identifier column 502, which may be used to specify, for each server, a server identifier. The management sub-system of the virtual computer system service may assign a server identifier to each individual server maintained and operated by the virtual computer system service that is made available for running virtual machine instances. For instance, when a new server is added to a fleet of dedicated servers or a fleet of general purpose (e.g., non-dedicated) servers, the management sub-system may automatically assign a server identifier to the new server and create an entry within the database 500 for the new server that includes at least this server identifier.

In addition to the server identifier column 502, the database 500 may include a reservation identifier column 504. This reservation identifier column 504 may be used by the management sub-system to specify a reservation identifier associated with each server identified through the server identifier column 502. For instance, as noted above, the management sub-system may generate a reservation identifier for each dedication such as a randomly generated alphanumeric value, a value that relates to the characteristics of the customer that has submitted the request to create the reservation (e.g., Bob's first reservation), a value that relates to the characteristics of the reserved dedicated server (e.g., Instance Type ABC reservation), a sequence number, or a sequence number or other value that has been obfuscated (e.g., through encryption). This reservation identifier may be stored within the database 500 in the reservation identifier column 504 and in association with a server identifier used to identify the server. Further, the management sub-system may provide this reservation identifier to the customer upon assignment of the reservation identifier. It should be noted that not every server entry within the database 500 may include a reservation identifier within the reservation identifier column 504 as any number of servers may not be allocated or otherwise reserved for a particular customer. Thus, for these servers, the reservation identifier entry may be blank.

The database 500 may include one or more server configuration columns 506, which may be used to describe the hardware and software specifications for each server provided by the virtual computer system service. For example, as illustrated in FIG. 5, the database 500 may include a processors column, which may be used to specify the number of physical processors for each server. The database 500 may include additional server configuration columns 506 based at least in part on the configuration of the servers and the amount of information to be included within the database 500. For instance, the database 500 may include a server type column, which may be used to specify a configuration identifier for each server. This configuration identifier may be used by the virtual computer system service to identify the hardware configuration (e.g., storage capacity, number of hard drives, number of slots, etc.) for a server. Further, the database 500 may include a server operating system (OS) column, which may be used to specify, for each server, the OS supported by the server. For instance, each server may be configured to accommodate virtual machine instances that utilize a particular OS. Thus, the server OS column may be used to identify any servers that may be used to accommodate a virtual machine instance The running instances column 508 within the database 500 may be used to specify the number of running virtual machine instances within each server specified within the database 500. For instance, a customer may submit a request (e.g., "RunInstances" web service or other API call) to the virtual computer system service to instantiate one or more virtual machine images onto one or more servers. For instance, in an embodiment, the customer, through an interface provided by the virtual computer system service, submits a request to the management sub-system (e.g., "DescribeServers" web service or other API call) to obtain a server identifier for each server reserved for the customer or otherwise being utilized by the customer. The customer may generate a request that may include a server identifier corresponding to the server that should be used for instantiating the virtual machine image. The management sub-system may evaluate the database 500 to identify the number of running instances specified within the running instances column 508 to determine whether the identified server has any slots available for the requested virtual machine instance. If there are slots available, the management sub-system may increment the specific running instances entry for the server by the number of instances added to the server. However, if the server has no capacity for another virtual machine instance, the server may identify any other servers allocated to the customer that may be used to run the requested instance.

As noted above, each dedicated server may include an "AutoRelease" parameter, which may be utilized to specify whether a dedicated server is to be released automatically in the event that the customer stops or otherwise terminates all virtual machine instances on the dedicated server. For instance, if the "AutoRelease" parameter is set to "TRUE" for a dedicated server, the management sub-system may automatically release this dedicated server upon determination that there are no virtual machine instances running on the dedicated server. For instance, if the "AutoRelease" parameter is set to "TRUE" and the dedicated server has no running virtual machine instances, the management sub-system may remove a reservation identifier from dedicated server entry within the server database (if provisioned on-demand) and enable other customers to utilize the dedicated server. Alternatively, if the dedicated server has been reserved for the customer, the management sub-system may maintain the reservation identifier, thus enabling the customer to continue exclusive use of the dedicated server. However, if the "AutoRelease" parameter for the dedicated server is set to "FALSE," the customer would be required to submit a request, through the interface, to release the dedicated server. This parameter may be specified within the database 500 through the Auto Release parameter column 510. The management sub-system may determine, based at least in part on the running instances column 508 within the database 500, whether a server no longer has any running instances. If so, the management sub-system may refer to the Auto Release parameter column 510 to determine whether the server is to be released (e.g., reservation identifier is removed from the reservation identifier column 504). In order to modify the "AutoRelease" parameter for a dedicated server, the customer may utilize the "ModifyServerAttribute" web service or other API, as described above, to toggle the parameter from "TRUE" to "FALSE" and vice versa. This may cause the management sub-system to access the database 500 to modify the "AutoRelease" parameter for the selected server within the Auto Release parameter column 510.

The database 500 may further include an Auto Placement parameter column 512, which may be used to modify an automatic placement parameter and specify whether a virtual machine instance may be automatically added to a server or a customer is required to specifically request that a virtual machine instance be placed in the server. As noted above, each dedicated server allocated to the customer includes an "AutoPlacement" parameter, which, when set to "TRUE," may enable the management sub-system to automatically run a virtual machine instance within the dedicated server. The customer, through the interface, may change, through use of the "ModifyServerAttribute" web service or other API, the "AutoPlacement" parameter of a dedicated server to "FALSE" to prevent the management sub-system from automatically running a virtual machine instance within the dedicated server 212, thus requiring the customer to specify that the virtual machine instance is to be run from this dedicated server. If the customer does not select a server identifier through the interface when submitting a request to run a virtual machine instance, the management sub-system may access the database 500 and utilize the Auto Placement parameter column 512 to identify any dedicated servers allocated for the customer that have the "AutoPlacement" parameter set to "TRUE" and automatically select any of these identified dedicated servers for running the virtual machine instance.

Figure 6:
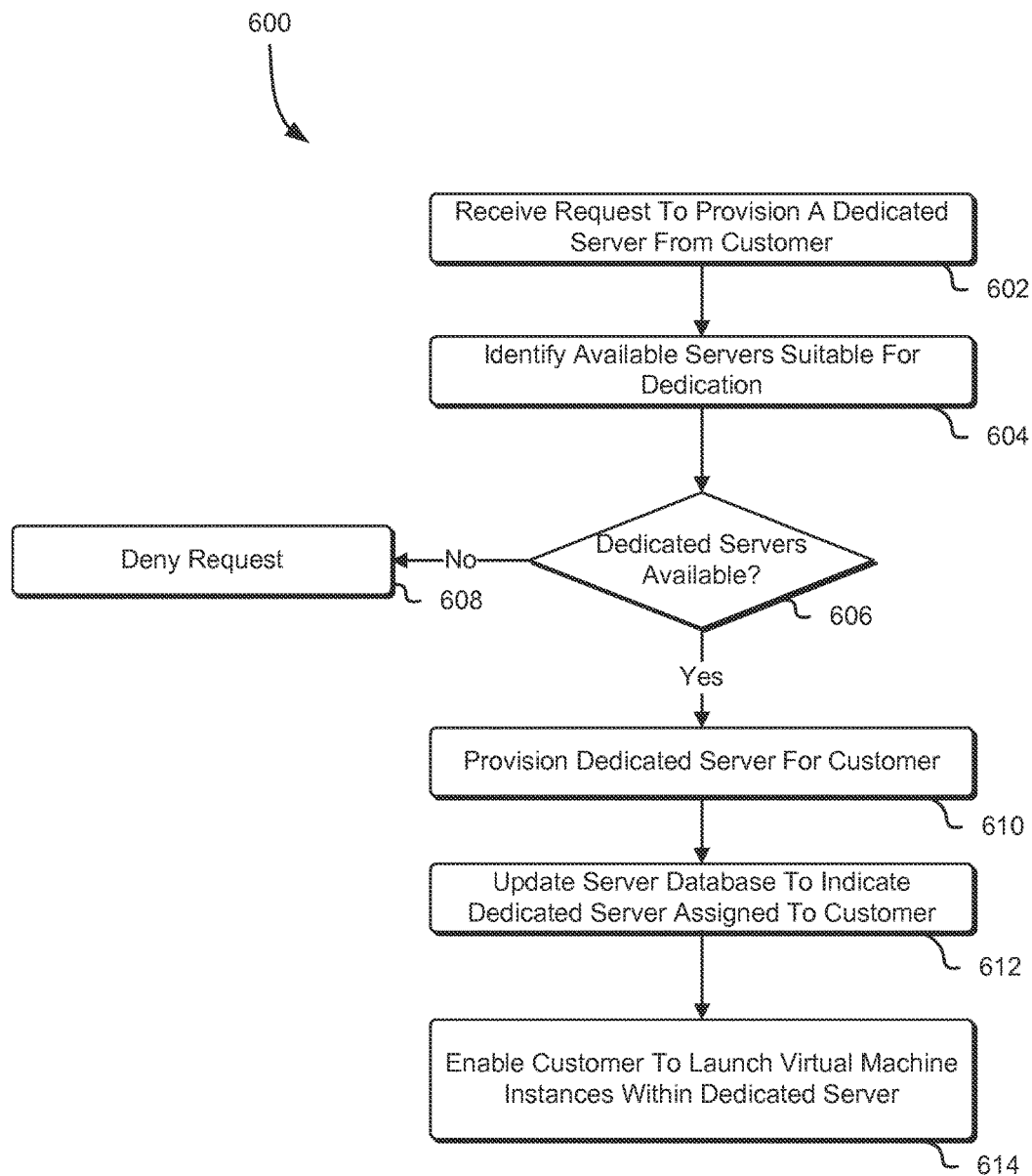
FIG. 6 shows an illustrative example of a process for provisioning one or more dedicated servers for at least one virtual machine instance based at least in part on a customer request in accordance with at least one embodiment.

As noted above, a virtual computer system service may receive a request from a customer to reserve and provision one or more dedicated servers, which may be provided to the customer for his/her exclusive use and for launching one or more virtual machine instances. Accordingly, FIG. 6 shows an illustrative example of a process 600 for provisioning one or more dedicated servers for at least one virtual machine instance based at least in part on a customer request in accordance with at least one embodiment. The process 600 may be performed by a management sub-system of the virtual computer system service, which may be configured to access a server data store to evaluate a variety of servers available for launching virtual machine instances to determine whether any of these servers may be dedicated to its customers upon request. Further, the management sub-system may be configured to access and modify server database within the server data store, which the management sub-system may use to indicate allocation of one or more dedicated servers to a particular customer.

A customer of the virtual computer system service may submit a request to the virtual computer system service to reserve one or more dedicated servers that may be used to launch one or more virtual machine instances. For instance, this request may be submitted through an "AcquireServer" web service or other API call to the service and may specify particular attributes that ideally these one or more dedicated servers should include. For instance, a customer may specify the number and size of the slots to be included within the dedicated server, as well as other hardware specifications (e.g., memory size, storage capacity, processor capabilities, etc.). Additionally, if the customer wishes to reserve a dedicated server, the request may be submitted through a "PurchaseReservedServer" web service or other API call to the service. Thus, the management sub-system may receive 602, through an interface provided to the customer by the virtual computer system service, a request from the customer to provision at least one dedicated server that is to be dedicated exclusively for the customer's needs.

Once the management sub-system has received the request from the customer through the interface, the management sub-system may access the server data store to identify 604 any available servers that are suitable for dedication to the customer. For instance, management sub-system may evaluate a database within the server data store to identify any servers that have the requisite capacity and capabilities as specified by the customer in his/her request. Further, the management sub-system may use the server database to determine whether these identified servers have been allocated to other customers. The server database, for each server managed by the virtual computer system service, may specify an identifier for the one or more customers that have been allocated at least some capacity of the server. Alternatively, the server database may specify that one or more instances are running within a server that does not have a reservation identifier associated with the server. This may serve as an indication that the server is being shared by various customers. Thus, if the management sub-system determines, for a given server, that one or more customers other than the requesting customer are utilizing the particular server, the management sub-system may deem the particular server to be unsuitable for dedication.

Based at least in part on the management sub-system's analysis of the various servers, the management sub-system may determine 606 if any dedicated servers are available for the exclusive use of the customer. For instance, if the management sub-system is unable to identify, based at least in part on the various server entries within the server database, any available servers that are suitable for dedication, the management sub-system may deny 608 the customer's request, as the servers either do not satisfy the customer's criteria for selection of a dedicated server or the servers that do satisfy the criteria are all allocated to other customers of the virtual computer system service. However, if the management sub-system identifies one or more servers that may be dedicated for the exclusive use of the customer, the management sub-system may provision 610 a dedicated server for the customer that satisfies the customer's criteria for selection. Further, in some embodiments, the management sub-system may generate a reservation identifier for the dedicated server, which may represent the customer's pool of dedicated servers, and send the reservation identifier to the customer. Thus, if the customer reserves additional dedicated servers, the management sub-system may utilize the same reservation identifier for these additional dedicated servers. Alternatively, a reservation identifier may be generated for each dedicated server reserved by the customer in response to distinct requests made by the customer for allocation of dedicated servers. The management sub-system, upon creation of a reservation identifier for a dedicated server, may access the server database and modify the server entry to include this reservation identifier.

The management sub-system, upon provisioning the dedicated server in response to the customer's request, may update 612 the server database within the server data store to indicate that the dedicated server has been assigned to the customer. As noted above, the server database may include an entry for each server maintained by the virtual computer system service. This entry may be used to specify the various virtual machine instances operating within the server, the corresponding customers for whom these virtual machine instances have been instantiated, and one or more virtual machine instances that may have previously been launched through the particular server. The management sub-system may update this entry to specify that the entire dedicated server has been allocated to the customer, thereby preventing any other customer from utilizing the server or the management sub-system from allocating any capacity of this server to another customer. The update to this entry may include generation of the aforementioned reservation identifier and addition of the reservation identifier to the server entry in the database. The virtual computer system service may subsequently enable 614 the customer to launch one or more virtual machine instances within the dedicated server.

Figure 7:
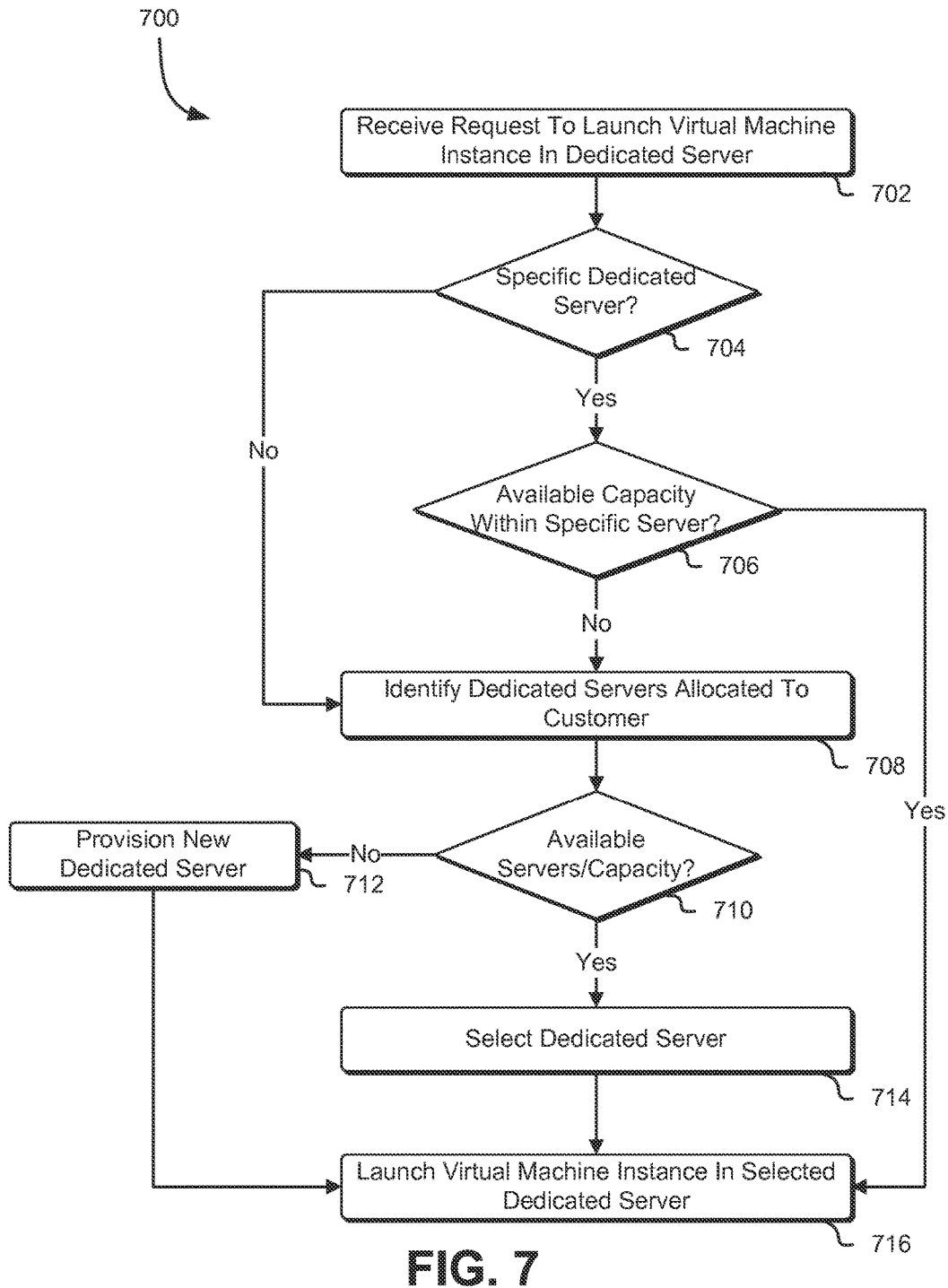
FIG. 7 shows an illustrative example of a process for launching a virtual machine instance within a dedicated server in accordance with at least one embodiment.

As noted above, a customer may submit a request to the virtual computer system service to launch one or more virtual machine instances in a dedicated server. The customer may have previously reserved one or more dedicated servers for his/her exclusive use, such as through the process described above in connection with FIG. 6. Alternatively, the customer may be issued with an on-demand dedicated server in response to his/her request, should the customer not have any reserved dedicated servers for his/her exclusive use. Accordingly, FIG. 7 shows an illustrative example of a process 700 for launching a virtual machine instance within a dedicated server in accordance with at least one embodiment. The process 700 may be performed by a management sub-system of the virtual computer system service, which may be configured to access a server database within a server data store to analyze any of the customer's dedicated servers and to verify customer operating system volume licenses as needed for launching the requested virtual machine instance.

At any time, the management sub-system may receive 702, through an interface configured to enable customer interaction with the virtual computer system service, a request from a customer to launch a virtual machine instance in a dedicated server. In some embodiments, if the customer has previously reserved one or more dedicated servers, the request may specify a particular server that the virtual computer system service should use in launching the requested virtual machine instance. For instance, the customer may specify, through a "RunInstance" web service or other API call to the management sub-system, a reservation identifier, which the management sub-system may use to identify any dedicated servers reserved for the customer. The management sub-system may provide corresponding server identifiers for each dedicated server covered by the reservation identifier to the customer through the interface. The customer may select any of these server identifiers to specify that the instance is to be initiated within the particular dedicated server. Alternatively, if the customer has not reserved a dedicated server for his/her exclusive use, the customer may specify, through the request, attributes of the server that should be allocated to the customer on-demand when launching the virtual machine instance. For example, the customer may submit a web service request to an "AcquireServer" web service or other API and pass in the request parameters such as an account identifier for the customer, virtual machine instance types the customer would like to host on the dedicated server, information such as a number of processors, amount of memory, amount of storage, amount of networking capacity, etc. The request may further specify an identifier or other designation for a virtual machine image that is to be used to launch the virtual machine instance.

Thus, the management sub-system may determine 704 whether the customer has specified, through an interface, a specific dedicated server that should be used to launch the virtual machine instance. For instance, if the customer has previously reserved one or more dedicated servers for his/her exclusive use and has provided a reservation identifier for his/her pool of dedicated servers or a particular reserved dedicated server, the management sub-system may present to the customer, through the interface, server identifiers for each of these one or more dedicated servers that may be available for the customer's exclusive use. The customer, through the interface, may then select an identifier for a dedicated server, which may serve as an indication of the customer's selection of a particular dedicated server that is to be used to launch the virtual machine instance. Alternatively, the customer may not be required to select a server identifier, which may serve as an indication to the management sub-system that the virtual machine instance may be placed in a dedicated server that has an "AutoPlacement" parameter set to "TRUE" and has sufficient capacity available for placement of the instance.

If the customer, through the interface, has selected a specific dedicated server that should be used to launch the desired virtual machine instance, the management sub-system may determine 706 whether the specific dedicated server selected by the customer has the available capacity to support the virtual machine instance. For instance, the management sub-system may access the server database within the server data store to evaluate the specific dedicated server and determine what available capacity is there for launching virtual machine instances. Capacity may be measured in various ways, such as in slots, CPU capacity, memory capacity, and/or in other ways. In some embodiments, the management sub-system may evaluate the server type, as well as the number of currently running instances to determine whether there is available capacity within the server for the virtual machine instance. If the virtual computer system service determines, based at least in part on an evaluation of the specified dedicated server, that there is available capacity to support the virtual machine instance, the virtual computer system service may launch 716 the virtual machine instance in the selected dedicated server. Additionally, the virtual computer system service may access the server database within the server data store to update the entry for the dedicated server to indicate that the virtual machine instance has been launched using this particular dedicated server. This may include updating the running instances entry for the particular dedicated server.

In an embodiment, the management sub-system of the virtual computer system service will require the customer to provide one or more operating system volume licenses in order to utilize the selected virtual machine image for launching the virtual machine instance. Thus, the management sub-system may determine if a customer's operating system volume license is required for launching the virtual machine instance. If such a license is required, the management sub-system may determine if said license is available for use. For instance, the customer may be required to provide his/her operating system volume license when submitting the request to launch the virtual machine instance on a dedicated server. Alternatively, the customer may purchase the operating system volume license directly through the virtual computer system service. If the operating system volume license is required but is not available (e.g., has not been provided by the customer or the virtual computer system service does not have a valid license on file for the particular virtual machine image), the management sub-system may deny the customer's request, as the customer may not be authorized to use the virtual machine image for his/her purposes.

If the specific dedicated server selected by the customer to launch the virtual machine instance does not have available capacity for launching the virtual machine instance, the management sub-system may identify 708 one or more dedicated servers that may have previously been allocated to the customer through a prior reservation. The management sub-system may access the server database within the server data store to locate any other dedicated servers the customer has reserved for his/her own exclusive use. The management sub-system may utilize this information from the server database to evaluate these one or more dedicated servers to determine 710 whether these dedicated servers have the available capacity for launch of the requested virtual machine instance. In an embodiment, the management sub-system evaluates, for each server entry within the server database of the customer's dedicated servers, the "Auto-Placement" parameter for the server to determine whether the virtual machine instance may be placed within the server. For instance, if the server's "AutoPlacement" parameter is set to "TRUE," the management sub-system may automatically place a virtual machine instance within the server. Alternatively, if the "AutoPlacement" parameter is set to "FALSE," the management sub-system may be required to receive an explicit request from the customer to place a virtual machine instance within the server.

As noted above, the customer may not have previously reserved a dedicated server for his/her own exclusive use and thus may not have specified a specific dedicated server for the virtual machine instance. In such instances, the management sub-system may not be required to determine 710 available capacity for the customer's dedicated servers as the customer may not have any allocated to him/her. Thus, the management sub-system, in response to an "Acquire-Server" API call from the customer through the interface, may be required to provision 712 a new dedicated server for the customer on an on-demand basis (e.g., when the customer releases the server, it is available for allocation to another customer). Alternatively, the management sub-system may provision 712 a new dedicated server for the customer if the virtual computer system service has determined that none of the customer's dedicated servers have the available capacity required for launching of the virtual machine instance. In order to provision this new dedicated server, the management sub-system may access the server database within the server data store to identify a server that not only has not been allocated to another customer (e.g., has no running instances and has not been assigned a reservation identifier) but also has sufficient capacity and the necessary specifications to enable launch of the virtual machine instance. The management sub-system may subsequently update the server database to indicate that this selected server has been dedicated for the exclusive use of the customer. For instance, the management sub-system may generate a new reservation identifier for the customer or utilize an existing reservation identifier for the customer to add the server to the customer's server pool. Alternatively, if the customer has previously reserved one or more dedicated servers for his/her exclusive use and one or more of these dedicated servers have sufficient available capacity for the virtual machine instance and have been designated as being usable for automatic instance placement (e.g., "AutoPlacement" parameter is set to "TRUE"), the management sub-system may select 714 a dedicated server from the customer's reserved pool of dedicated servers.

Once the management sub-system has either provisioned a new dedicated server for the customer or has selected a dedicated server from the customer's pool of dedicated servers, the management sub-system may launch 716 the virtual machine instance in the dedicated server. Additionally, the management sub-system may access the server database within the server data store to update the entry for the dedicated server to indicate that the virtual machine instance has been launched using this particular dedicated server and a corresponding customer identifier for the virtual machine instance. For instance, the management sub-system may update the running instances entry for the dedicated server to indicate that a new virtual machine instance is running within the server. This may enable the management sub-system to track the dedicated server used to launch the virtual machine instance if the instance is stopped by the customer and/or the dedicated server is released.

Figure 8:
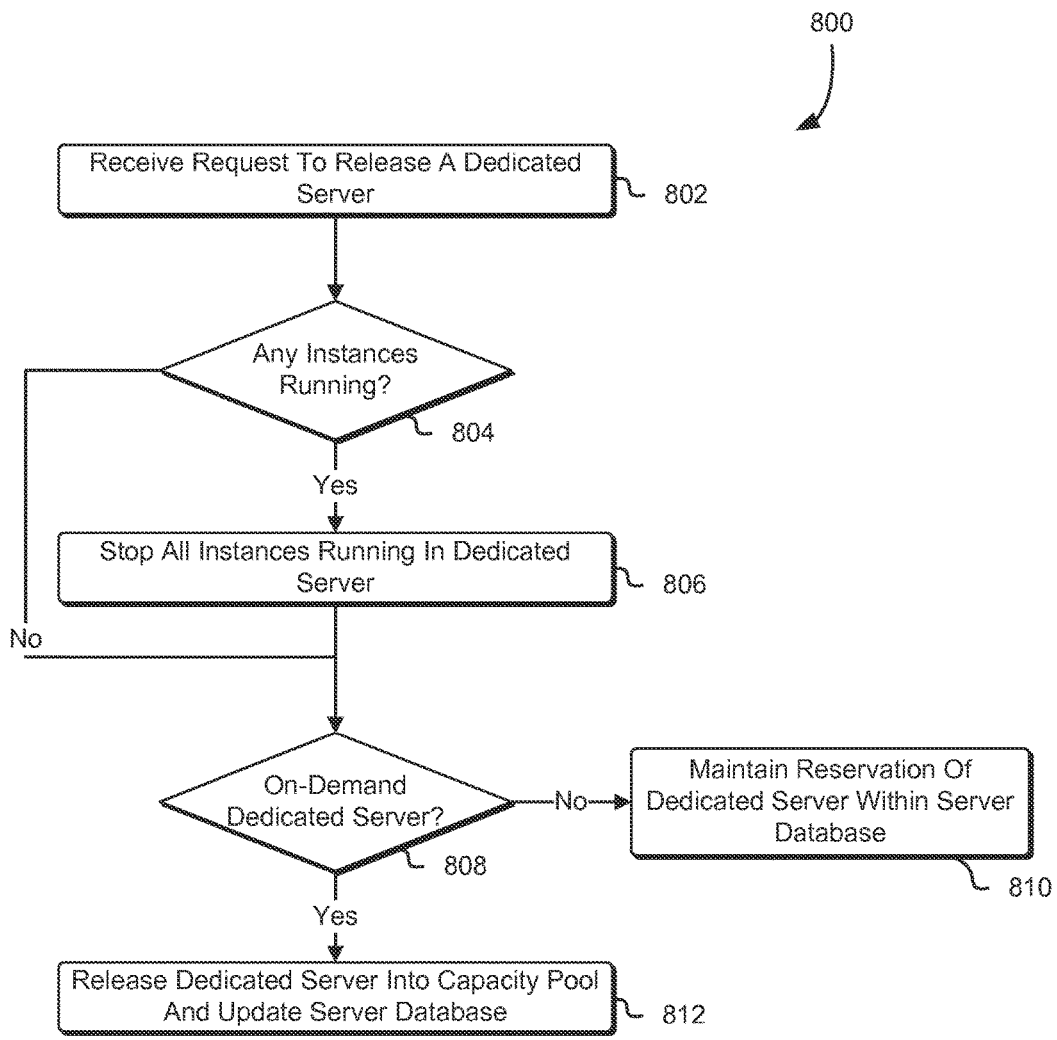
FIG. 8 shows an illustrative example of a process for releasing a dedicated server in response to a customer request in accordance with at least one embodiment.

As noted above, a customer may at any time transmit a request to the virtual computer system service to release a dedicated server. The customer, for instance, may submit a web service request to a "ReleaseServer" web service or other API to request that a particular dedicated server be released. The customer may submit such a request if the customer is required to pay an hourly rate for use of a dedicated server and wishes to release the dedicated server if he/she is no longer utilizing the dedicated server. Alternatively, the dedicated server may be released in response to the customer's reservation of the dedicated server having expired or if no remaining virtual machine instances are running within the dedicated server and the "AutoRelease" parameter for the dedicated server is set to "TRUE". Accordingly, FIG. 8 shows an illustrative example of a process 800 for releasing a dedicated server in response to a customer request in accordance with at least one embodiment. The process 800 may be performed by the management sub-system of a virtual computer system service, which may be configured to access existing dedicated servers to release any dedicated servers as required. Further, the management sub-system may be configured to access a server database within a server data store to specify release of the dedicated server and any virtual machine instances that may have been operating within the released dedicated server.

At any time, the management sub-system may receive 802, through an interface made available to customers of the virtual computer system service, a request from a customer to release a dedicated server. The customer, for instance, may submit a web service request to a "ReleaseServer" web service or other API to request that a particular dedicated server be released. The dedicated server may have been allocated to the customer on-demand as a result of a prior customer request to launch a virtual machine instance within a dedicated server and the customer not having a previously reserved pool of dedicated servers for his/her exclusive use. Alternatively, the dedicated server may have been previously reserved for the customer, wherein the dedicated server may be reserved for a specific period of time. The customer may desire to release this reserved server for use with other virtual machine instances or to have the capacity available for other purposes.

Once the management sub-system has received a request to release a particular dedicated server, the management sub-system may determine 804 if there are any virtual machine instances currently running on the selected dedicated server. For instance, the management sub-system may access a server database within the server data store, wherein an entry for the selected dedicated server may specify an identifier for each virtual machine instance currently operating within the dedicated server. If the management sub-system determines, based at least in part on this entry within the server database, that one or more virtual machine instances are operating within the dedicated server, the management sub-system may stop 806 these virtual machine instances and modify the dedicated server entry within the server database to indicate that these virtual machine instances have now been stopped. In an alternative embodiment, if the virtual computer system service determines there are any virtual machine instances running on the selected dedicated server, the virtual computer system service will reject the customer's request until the customer himself/herself has terminated the running instances. In some embodiments, the management sub-system may pause the running virtual machine instances within the dedicated server. This may enable the customer to resume use of the instances at a later time without potentially major disruptions to the customer's use of these instances.

If the selected dedicated server to be released has no operating virtual machine instances or the operating virtual machine instances have been stopped, the management sub-system may determine 808 whether the dedicated server to be released is an on-demand dedicated server. If the dedicated server was reserved for the customer (e.g., not on-demand), the management sub-system may maintain 810 the customer's reservation of the dedicated server within the server database. For instance, the management sub-system may access the server database within the server data store to modify the entry for the dedicated server to indicate that the dedicated server is now available for further resource allocation on behalf of the customer (e.g., the running instances entry is set to 0). However, the virtual computer system service may not indicate, through this entry, that the dedicated server is now available for use by other customers. For instance, the reservation identifier entry for the particular dedicated server may still include the reservation identifier previously assigned to the dedicated server and provided to the customer.

Alternatively, if the dedicated server is an on-demand dedicated server allocated to the customer in response to a prior request to launch a virtual machine instance, the management-sub-system may release 812 the dedicated server into the server capacity pool for allocation to other customers and update the server database within the server data store to indicate the release of this particular dedicated server. For instance, the management sub-system may modify the reservation identifier entry for the particular dedicated server to indicate that the dedicated server is no longer assigned to the customer. The dedicated server may be released to a specific dedicated server capacity pool, which may include a variety of dedicated servers that may only be provided to customers for their exclusive use. Thus, no dedicated server within this capacity pool may be shared with other customers. Alternatively, the released server may be added to a general capacity pool, which may include one or more servers that may be apportioned to a variety of customers and may be shared among these customers as needed.

In some embodiments, the management sub-system may release 812 the dedicated server into the capacity pool with the virtual machine instances still running within the server. For instance, the management sub-system may evaluate the one or more virtual machine instances operating within the dedicated server to determine whether these instances are subject to one or more license obligations (e.g., need to be operating using dedicated hardware, etc.). If the virtual machine instances running within the server are not subject to any license obligations, the management sub-system may update metadata associated with these instances to specify that they are no longer associated with dedicated hardware. Further, the management sub-system may enable other customers to utilize any available capacity within this server for their purposes.

It should be noted that the process 800 may be performed with additional, fewer, or alternative operations. For instance, in an embodiment, if the management sub-system determines that a dedicated server has no running virtual machine instances, the management sub-system, in some embodiments, will access the server database within the server data store to determine whether the dedicated server is to be released. As noted above, each server may include an "AutoRelease" parameter that serves as an indication as to whether the server is to be released automatically in the event that there are no running instances within the server. If the "AutoRelease" parameter is set to "TRUE," the management sub-system may release the server automatically. If the server is linked to a reservation, the management sub-system may still maintain the reservation by keeping the reservation identifier for the customer within the reservation identifier entry in the server database. However, if the server was provisioned on-demand, the server may be released to the server capacity pool for use by any customer. Alternatively, if the "AutoRelease" parameter is set to "FALSE," the management sub-system may not be able to release the server unless requested by the customer. Thus, even on-demand servers may still be allocated to the customer even if there are no running instances within the server.

Figure 9:
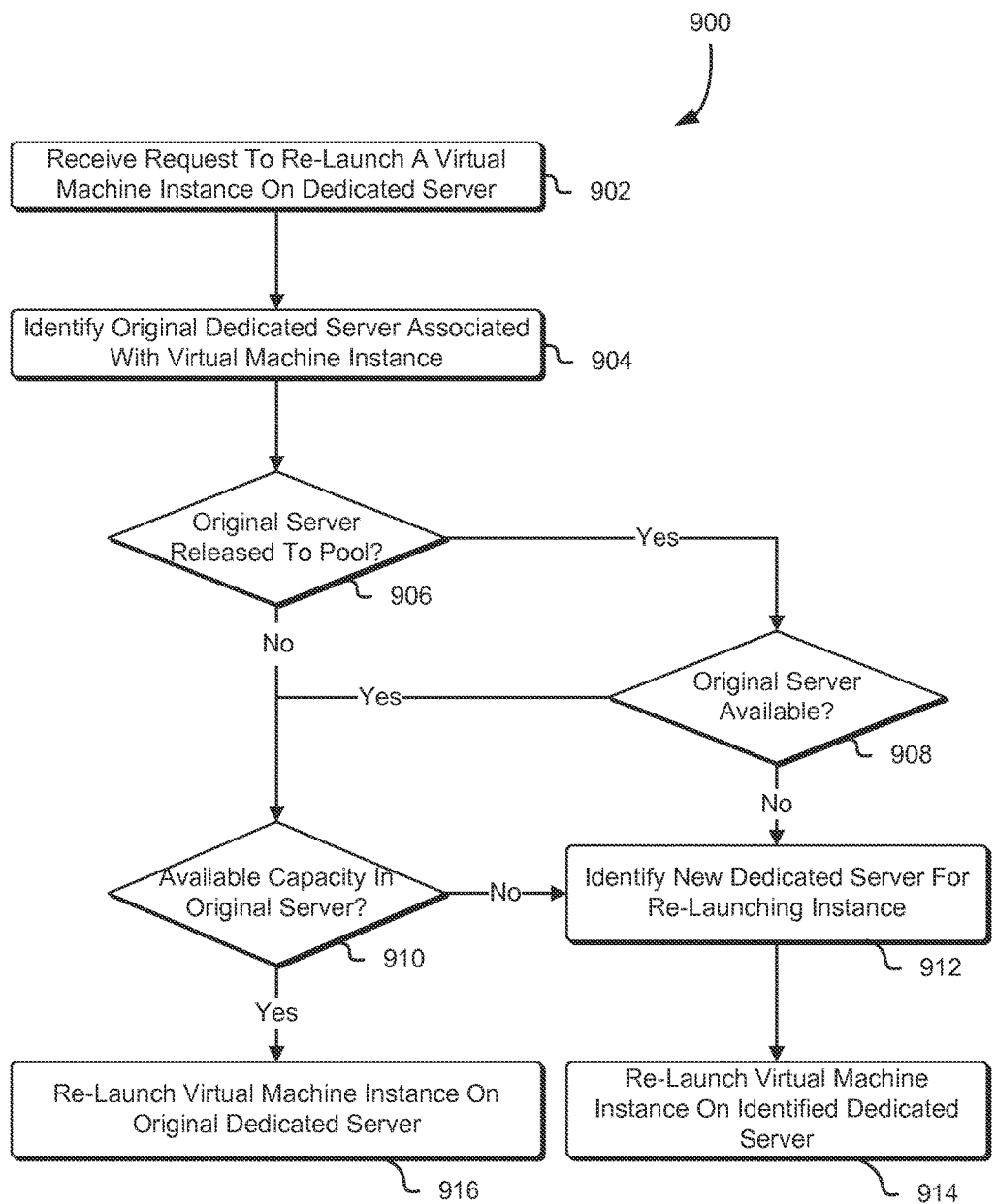
FIG. 9 shows an illustrative example of a process for re-launching a virtual machine instance on a dedicated server in accordance with at least one embodiment.

As noted above, a customer may, at a later time, wish to re-launch a stopped or paused virtual machine instance utilizing a dedicated server. Ideally, the dedicated server selected for re-launching this virtual machine instance may be the same dedicated server originally used to launch and operate the virtual machine instance, as this dedicated server may provide the necessary hardware specifications for operating the virtual machine instance. Further, if the virtual machine instance is subject to an operating system volume license, re-launching the virtual machine instance in the same dedicated server may obviate the need for the customer to pay an additional license usage fee, as the virtual machine instance may still be attached to the same hardware. Accordingly, FIG. 9 shows an illustrative example of a process 900 for re-launching a virtual machine instance on a dedicated server in accordance with at least one embodiment. The process 900 may be performed by a management sub-system of a virtual computer system service, which may be configured to access a server database within a server data store to identify the dedicated server originally used to operate the virtual machine instance and other dedicated servers that may be used to re-launch the virtual machine instance should the original dedicated server used to run the virtual machine instance is no longer available.

At any time, the management sub-system may receive 902 a request from a customer, through an interface provided by the virtual computer system service, to re-launch a virtual machine instance on a dedicated server. The customer may have previously had a dedicated server allocated for his/her exclusive use, through which the virtual machine instance may have been used. This dedicated server may have been released upon customer request by management sub-system and made available for other customers. For instance, if the dedicated server was originally provided to the customer on-demand, the management sub-system may release the dedicated server into a pool of available servers which may be allocated to any customer as needed. Alternatively, if the dedicated server was originally reserved for the customer, and the reservation has not expired, the management sub-system may maintain the dedicated server for the customer's exclusive use.

As described above in connection with FIG. 8, when a dedicated server is released, the management sub-system may update a corresponding server database entry within a server data store to specify that any operating virtual machine instances within the dedicated server have been stopped or otherwise paused in response to a customer request or by virtue of the server being released. Additionally, for each of these stopped or paused virtual machine instances, the management sub-system may specify, within the server database, the original dedicated server used to operate these virtual machine instances. Thus, the virtual computer system service may identify 904 the original dedicated server associated with the virtual machine instance to be re-launched.

Once the management sub-system has identified the original dedicated server used to operate the virtual machine instance, the management sub-system may determine 906 if the original dedicated server has been released to an available capacity pool, which may include one or more servers that may be dedicated to other customers. If the original dedicated server has been released to this pool, the management sub-system may determine 908 whether the original dedicated server is still available for allocation to the customer. For instance, if the original dedicated server has not been allocated to another customer or has been apportioned to various customers for their virtual machine instances, the management sub-system may determine that the original dedicated server is still available for the customer. Alternatively, if the original dedicated server has been apportioned to other customers of the virtual computer system service, or another customer has reserved or otherwise provisioned the original dedicated server, the server may be unavailable to the customer for use with his/her virtual machine instance.

If the management sub-system determines that the original dedicated server has been allocated to another customer or is otherwise unavailable to the customer, the management sub-system may identify 912 a new dedicated server for re-launching the virtual machine instance. For example, the management sub-system may access the server database within the server data store to identify any available servers that not only have not been allocated to another customer, but also have the available capacity and specifications to enable re-launch of the virtual machine instance. For instance, the management sub-system may evaluate a variety of server entries within the database to identify any servers that do not have a reservation identifier associated with them and also do not have any running instances of other customers. Further, the management sub-system may evaluate the hardware and software specifications of any of these available servers to determine whether any of these are capable of being used for the virtual machine instance. The management sub-system, upon identifying a new dedicated server for the instance, may update the server database to specify that this identified server has now been dedicated for the customer's exclusive use. This may include generating a new reservation identifier for the dedicated server, which may be provided to the customer for later use if he/she desires to launch other virtual machine instances within this dedicated server. Further, the management sub-system may use this newly dedicated server to re-launch 914 the virtual machine instance for the customer.

If the original dedicated server has not been released to the pool of available servers and/or has not been allocated to another customer, the management sub-system may determine 910 whether the original dedicated server still has available capacity for supporting the re-launch of the virtual machine instance. For instance, if the original dedicated server is still reserved for the customer's exclusive use, the management sub-system may determine if the customer has left sufficient capacity available within this reserved dedicated server for re-launch of the virtual machine instance. For instance, the management sub-system may examine the server entry within the server database to identify any running instances within the server and, based on these identified instances, determine whether there is sufficient capacity to support an additional virtual machine instance where capacity of the server may be limited to a number of units, where each virtual machine may have an assigned number of units (e.g., "1" for a standard virtual machine and a number greater than 1 for a type of virtual machine that receives a higher resource allocation in one or more respects). If the original dedicated server does not have the available capacity to support re-launch of the virtual machine instance or has been allocated to another customer, the management sub-system may identify 912 a new dedicated server and re-launch 914 the virtual machine instance in this new dedicated server. However, if the original dedicated server may be used, the management sub-system may re-launch 916 the virtual machine instance on the original dedicated server.

It should be noted that in some embodiments, the process 900 may be performed using additional and/or alternative operations. For instance, the virtual machine instance may be subject to an operating system volume license, wherein a customer may be required to pay an additional fee for each hardware configuration (e.g., server) used to launch the virtual machine instance. Under such circumstances, the management sub-system may deny the customer's request to re-launch the virtual machine instance if the original dedicated server is not available to the customer as a result of the dedicated server being released to the pool of available servers and allocated for use by another customer. Additionally, the request may be denied if the original dedicated server no longer has sufficient capacity to support a re-launch of the virtual machine instance. In some embodiments, instead of immediately denying the customer's request, the management sub-system may notify the customer, through an interface provided by the virtual computer system service, that the original dedicated server is no longer available. Further, the management sub-system may enable the customer to determine whether he/she would be amenable to paying the license fee should the customer still want to re-launch the virtual machine instance utilizing a different dedicated server. If so, the management sub-system may identify 912 a new dedicated server and re-launch 914 the virtual machine instance on this new dedicated server.

Figure 10:
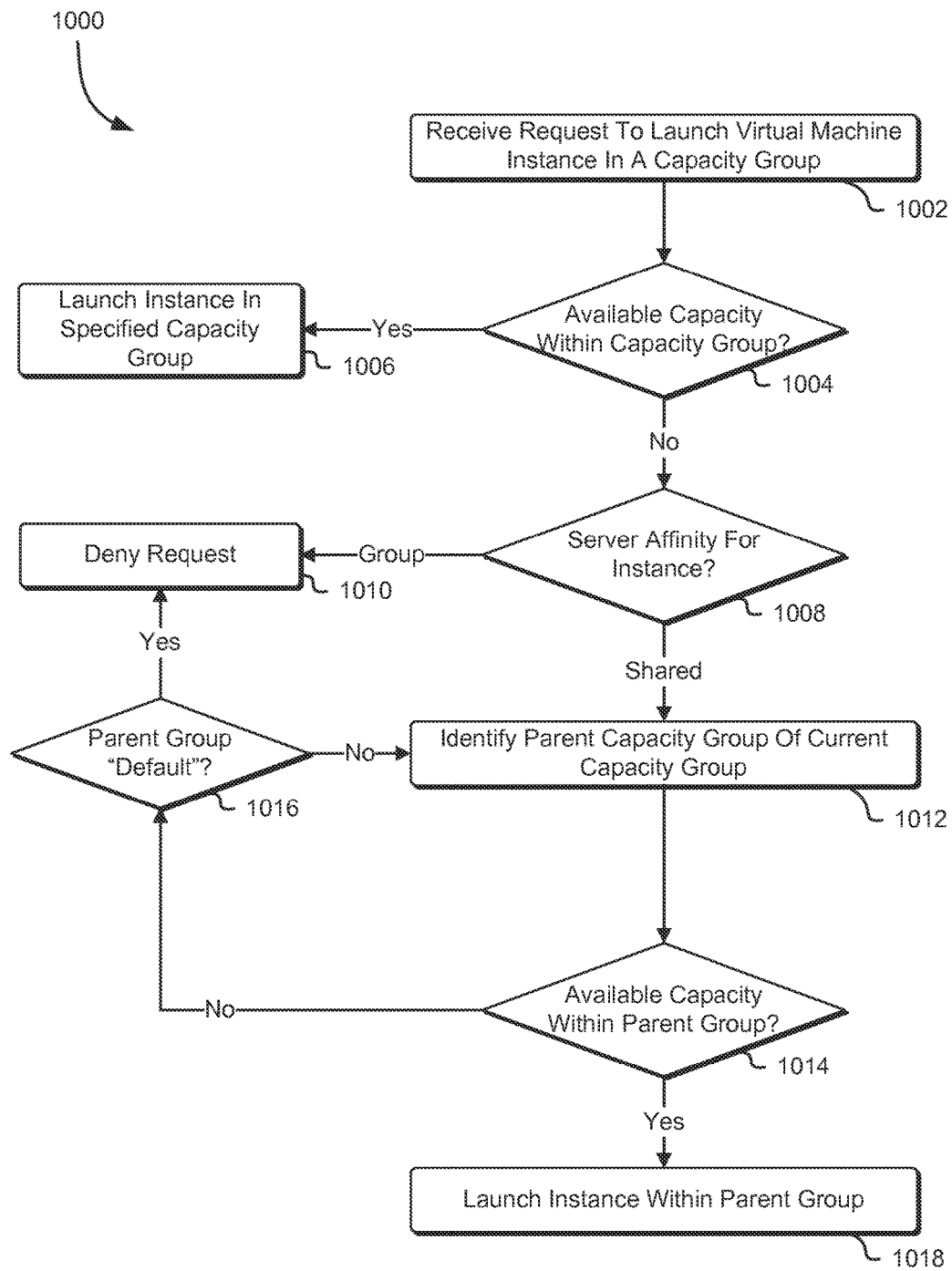
FIG. 10 shows an illustrative example of a process for launching a virtual machine instance within a specified capacity group in accordance with at least one embodiment.

As noted above, a customer of the virtual computer system service may submit a web service request to a "CreateCapacityGroup" API to generate a capacity group for one or more of the customer's dedicated servers. When a customer submits a request to launch a virtual machine instance within a capacity group, the management sub-system of the virtual computer system service may determine whether the capacity group has sufficient capacity to support the virtual machine instance. If the capacity group does not have sufficient capacity to support the virtual machine instance, the management sub-system may determine whether the instance may be launched in a parent capacity group within the capacity group hierarchy. If so, the management sub-system may launch the instance within this parent capacity group if there is sufficient capacity to support the virtual machine instance. If not, the management sub-system may deny the request. Accordingly, FIG. 10 shows an illustrative example of a process 1000 for launching a virtual machine instance within a specified capacity group in accordance with at least one embodiment. The process 1000 may be performed by the aforementioned management sub-system, which may be configured to evaluate a server affinity identifier for a virtual machine instance to determine proper placement of the virtual machine instance. Further, the management sub-system may be configured to access a server database within the server data store to determine the available capacity of a particular capacity group, as specified within the request.

At any time, the management sub-system may receive 1002, through an interface configured to enable customer interaction with the virtual computer system service, a request from a customer to launch a virtual machine instance in a capacity group. As noted above, the customer may specify, through a "RunInstance" web service or other API call to the management sub-system, a reservation identifier, which the management sub-system may use to identify any dedicated servers reserved for the customer. This reservation identifier may further be used by the management sub-system to identify any capacity groups created by the customer and that may encompass one or more dedicated servers reserved for the customer. The management sub-system may provide corresponding capacity group identifiers for each capacity group covered by the reservation identifier to the customer through the interface. The customer may select any of these capacity group identifiers to specify that the instance is to be initiated within a particular capacity group.

When the management sub-system receives the request from the customer to launch a virtual machine instance using a dedicated server within the specified capacity group, the management sub-system may determine 1004 whether the specified capacity group has the available capacity necessary to support the virtual machine instance. The management sub-system may access a server database within the server data store to identify the one or more dedicated servers that comprise the capacity group. For instance, the management sub-system may utilize the capacity group identifier to identify any dedicated server entries that include the same capacity group identifier. This may serve as an indication that a dedicated server is part of the capacity group. Once the management sub-system has identified the one or more dedicated servers that comprise the capacity group, the management sub-system may assess the amount of available capacity within the capacity group and determine whether any dedicated server of the group may support the virtual machine instance. If so, the management sub-system may launch 1006 the virtual machine instance in a dedicated server of the specified capacity group.

If the specified capacity group does not have sufficient available capacity to support the virtual machine instance, the management sub-system may determine 1008 the server affinity for the particular virtual machine instance. As noted above, each virtual machine instance may include a server affinity identifier, which may be used to determine which dedicated servers may be utilized to support the virtual machine instance. For instance, by default, each virtual machine instance that is to be initially launched (e.g., not previously stopped or paused) within a specified capacity group may be given a server affinity identifier that is set to "GROUP" by default. Once the virtual machine instance has been launched, a customer may submit a web service request to a "ModifyInstranceAttribute" API to change the server affinity identifier for the virtual machine instance. For instance, if the customer submits a request to change the server affinity identifier for a virtual machine instance from "GROUP" to "SHARED," the management sub-system may update the identifier for the virtual machine instance such that, if the instance is re-launched at a later time, the virtual machine instance may be launched within any dedicated server that is part of the capacity group hierarchy, as will be described in greater detail below. Alternatively, the customer may submit a request to change the server affinity identifier for the virtual machine instance to "SERVER." This may serve as an indication that the virtual machine instance may only be launched within a particular dedicated server. Thus, if at a later time there is no available capacity within the specific dedicated server to support the virtual machine instance upon re-launch, the management sub-system may deny the request to re-launch the instance.

If the server affinity identifier for the virtual machine instance is set to "GROUP," the management sub-system may deny 1010 the customer's request to launch the virtual machine instance within the capacity group, as the capacity group does not have sufficient capacity to support the virtual machine instance. However, if the server affinity identifier for the virtual machine instance is set to "SHARED," the management sub-system may identify 1012 a parent capacity group of the specified capacity group and determine 1014 whether this parent capacity group has sufficient available capacity to support the virtual machine instance. For instance, the management sub-system may maintain a capacity group hierarchy for the customer's dedicated servers. This hierarchy may include an overarching default capacity group, which may encompass each dedicated server allocated to the customer. When the customer creates a new capacity group, the customer may specify a capacity group identifier for the capacity group and a path for the capacity group within the capacity group hierarchy. For example, when a customer creates a first capacity group, this capacity group may be a direct child of the default capacity group. If the customer generates a second capacity group, he/she may specify whether this new capacity group is a child of either the default group or the first capacity group generated in response to the customer's request. Thus, the customer may specify where in the capacity group hierarchy each capacity group may reside.

If the identified parent capacity group does not have the available capacity to support the virtual machine instance, the management sub-system may determine 1016 whether the identified parent capacity group is the default group. If the identified parent capacity group is, in fact, the default group, the management sub-system may deny 1010 the customer's request to launch the virtual machine instance, as no dedicated servers are available to support the virtual machine instance. The customer may provision one or more dedicated servers, which may be added to any capacity group to enable the customer to launch the virtual machine instance or wait until a dedicated server becomes available within the specified capacity group that can support the virtual machine instance. However, if the parent capacity group is not the default group, the management sub-system may identify 1012 the parent capacity group of this particular capacity group to try and identify a dedicated server that may be used to support the virtual machine instance. If a dedicated server is found within a capacity group within the capacity group hierarchy, the management sub-system may launch 1018 the virtual machine instance within the identified capacity group.

Figure 11:
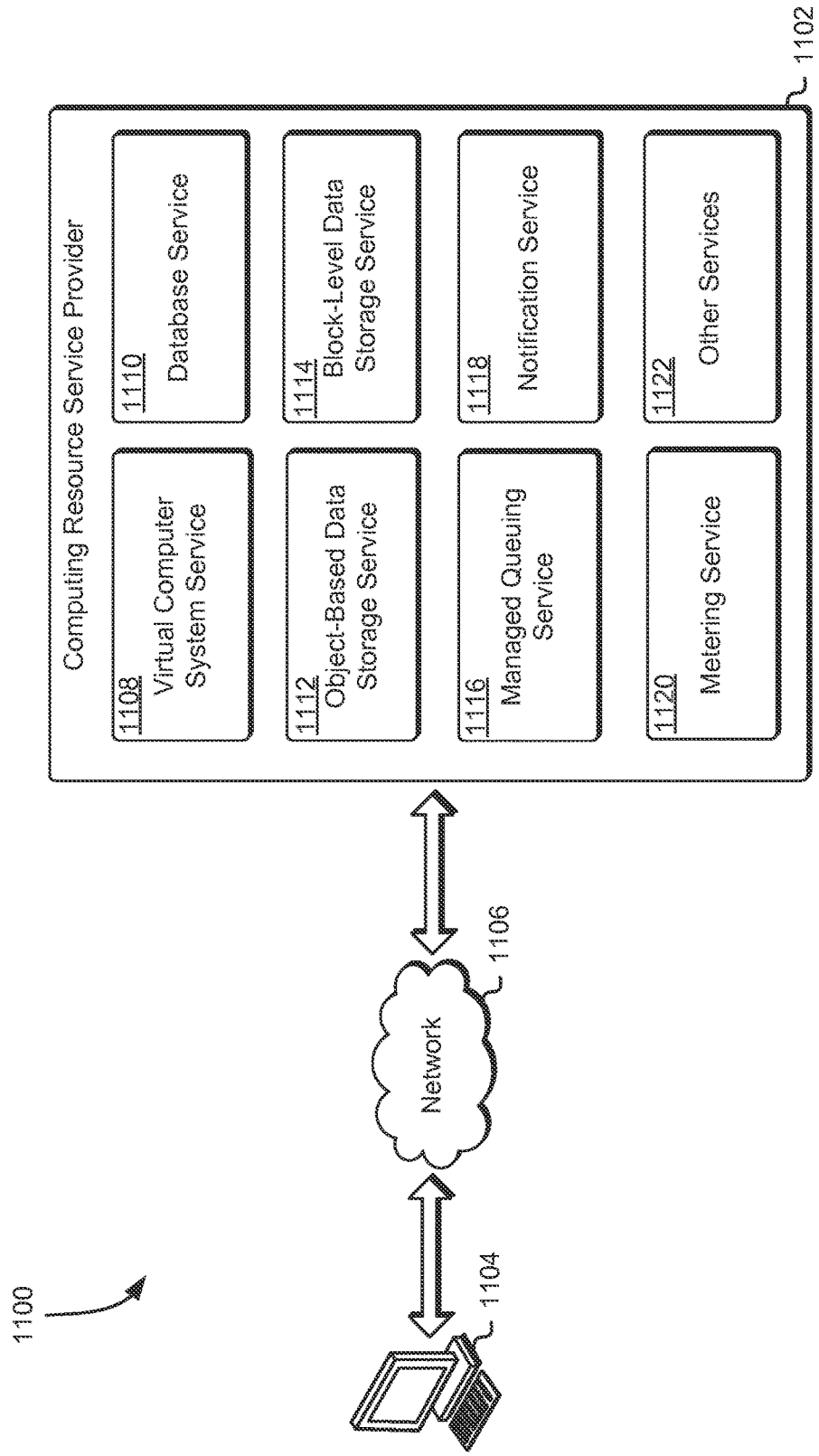
FIG. 11 shows an illustrative example of an environment in which various embodiments can be implemented.

FIG. 11 shows an illustrative example of an environment 1100 in which various embodiments can be implemented. In the environment 1100, a computing resource service provider 1102 may provide a variety of services to a customer 1104 or other users. The customer 1104 may be an organization that may utilize the various services provided by the computing resource service provider 1102 to remotely provision and maintain one or more resources and define a level of access for users of his or her resources. As illustrated in FIG. 11, the customer 1104 may communicate with the computing resource service provider 1102 through one or more communications networks 1106, such as the Internet. Some communications from the customer 1104 to the computing resource service provider 1102 may cause the computing resource service provider 1102 to operate in accordance with various techniques described herein or variations thereof.

As noted above, a computing resource service provider 1102 may provide various computing resource services to its customers. For instance, in this particular illustrative example, the computing resource service provider 1102 provides at least seven types of services. The services provided by the computing resource service provider, in this example, include a virtual computer system service 1108, a database service 1110, an object-based data storage service 1112, a block-level data storage service 1114, a managed queuing service 1116, a notification service 1118, a metering service 1120 and one or more other services 1122, although not all embodiments of the present disclosure will include all such services and additional services may be provided in addition to or as an alternative to services explicitly described herein.

The virtual computer system service 1108 may be a collection of computing resources configured to instantiate virtual machine instances onto virtual computer systems on behalf of the customers 1104 of the computing resource service provider 1102. Customers 1104 of the computing resource service provider 1102 may interact with the virtual computer system service 1108 to provision and operate virtual computer systems that are instantiated on physical computing devices hosted (e.g., servers) and operated by the computing resource service provider 1102. The virtual computer systems may be used for various purposes, such as to operate as servers supporting a website. Other applications for the virtual computer systems may be to support database applications, electronic commerce applications, business applications and/or other applications.

In an embodiment, a management sub-system of the virtual computer system service 1108 is configured to assign one or more dedicated servers for the exclusive use of the customer 1104 upon request. For instance, the customer 1104 may reserve one or more dedicated servers for his/her exclusive use, particularly for launching virtual machine instances. Alternatively, if the customer 1104 submits a request to the virtual computer system service 1108, through an interface provided by the service 1108, to launch a virtual machine instance utilizing a dedicated server, the management sub-system may access a server database within a server data store maintained by the virtual computer system service 1108 to identify any available servers that may be dedicated for the exclusive use of the customer 1104 and assign one or more dedicated servers to the customer 1104. This may enable the customer 1104 to launch one or more virtual machine instances within these dedicated servers.

The database service 1110 may be a collection of computing resources that collectively operate to run one or more databases for one or more customers 1104. Customers 1104 of the computing resource service provider 1102 may operate and manage a database from the database service 1110 by utilizing appropriately configured API calls. This, in turn, may allow a customer 1104 to maintain and potentially scale the operations in the database.

The object-based data storage service 1112 may comprise a collection of computing resources that collectively operate to store data for a customer 1104. The data stored in the data storage service 1112 may be organized into data objects. The data objects may have arbitrary sizes except, perhaps, for certain constraints on size. Thus, the object-based data storage service 1112 may store numerous data objects of varying sizes. The object-based data storage service 1112 may operate as a key value store that associates data objects with identifiers of the data objects which may be used by the customer to retrieve or perform other operations in connection with the data objects stored by the object-based data storage service 1112. Access to the object-based data storage service 1112 may be through appropriately configured API calls.

The block-level data storage service 1114 may comprise a collection of computing resources that collectively operate to store data for a customer. For instance, the block-level data storage system may be configured to provide block-level data storage volumes for use with a virtual machine instance, as noted above. A customer may interact with the block-level data storage service 1114 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The managed queuing service 1116 may be a collection of computing resources configured to enable customers 1104 to store one or more messages in queues for use by one or more services provided by the computing resource service provider 1102. Each message that is stored in a queue may comprise one or more appropriately configured API calls which, when processed by the recipient service, may cause the service to perform one or more actions. Alternatively, each message may comprise any variation of text, such as programming code, URLs for data objects and other statements.

The notification service 1118 may be a collection of computing resources configured to enable customers 1104 to send and receive notifications through a communications network 1106. A customer 1104 may utilize an interface, provided by the computing resource service provider 1102, to create or subscribe to one or more subjects to which one or more messages may be published through. For instance, a customer 1104 may use the interface to create a new subject and subscribe to this subject by specifying that any messages published to the subject may be transmitted to a particular location (e.g., electronic mail address, one or more servers, an existing queue within the managed queuing service 1116, etc.). Accordingly, when a customer 1104 publishes a message to the subject, the message may be transmitted to each recipient subscribed to the subject.

The metering service 1120 may provide a variety of services to enable administrators of the computing resource service provider 1102 to determine bandwidth pricing for one or more customers 1104 based at least in part on each customer's bandwidth utilization at certain times. The metering service 1120 may be configured to obtain raw metering data from a data storage service, such as the object-based data storage service 1112 or the block-level data storage service 1114 described above, and utilize a map reduce process to aggregate this metering data at a certain level of granularity (e.g., five minute intervals, fifteen minute intervals, etc.). Further, the metering service may be configured to categorize the metering data based at least in part on the network bandwidth flow among the computing resource services provided by the computing resource service provider. For instance, the metering service may categorize the metering data based at least in part on the flow of data through the network (e.g., from the customer 1104 to the computing resource service, from the computing resource service to the customer 1104, from a computing resource service to another service, etc.). This may enable administrators of the computing resource service provider 1102 to identify any customers 1104 that may be driving peak bandwidth usage and apportion a cost burden to these customers 1104.

Figure 12:
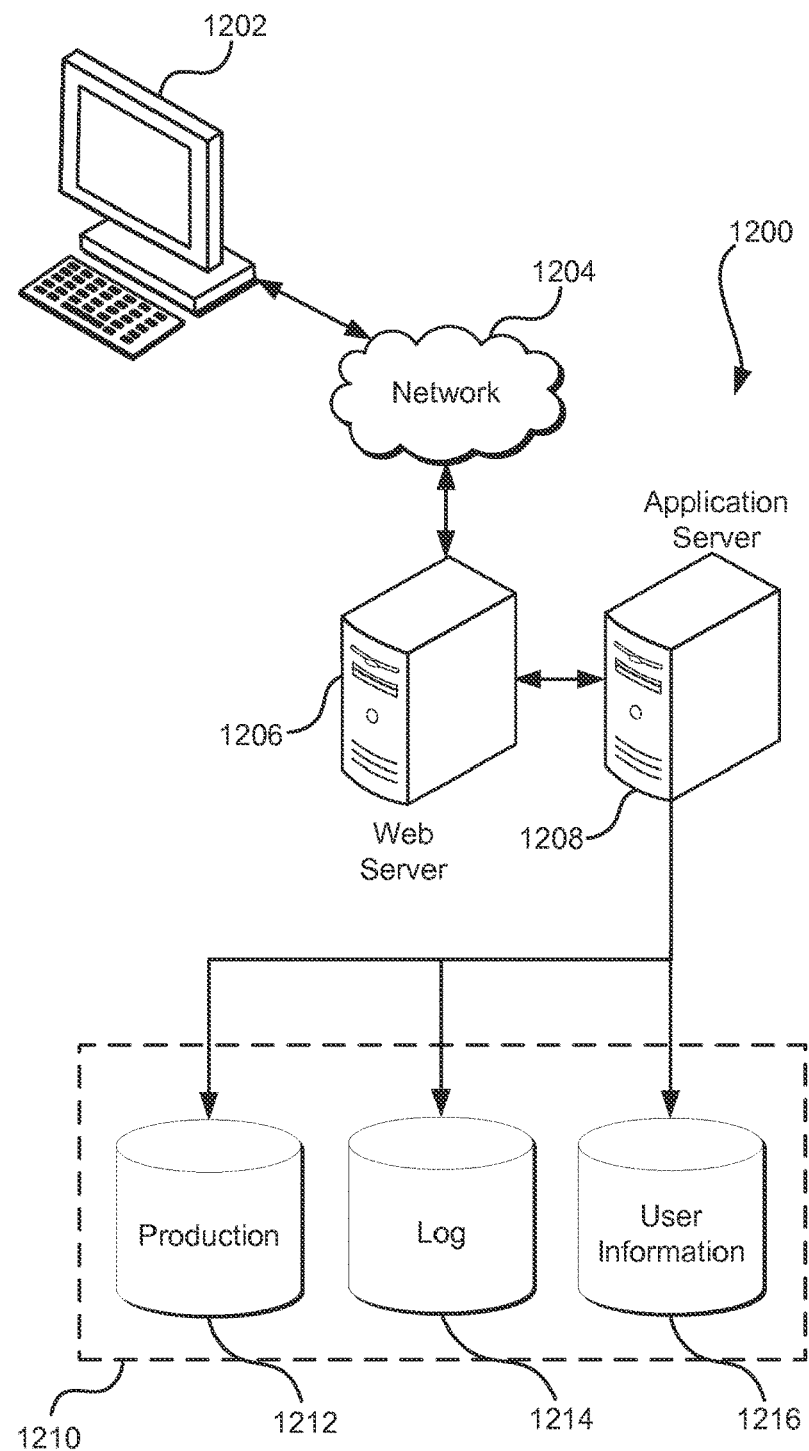
FIG. 12 shows an illustrative example of an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, as a result of being executed by one or more processors of a computer system, cause the computer system to at least:
   receive, from a customer to a web service interface running on a hardware server of a plurality of hardware servers, a request to launch a virtual machine instance, the request specifying a reservation identifier for a dedicated hardware server, the dedicated hardware server provisioned for exclusive use of the customer and among the plurality of hardware servers used to run virtual machine instances for a plurality of customers;
   determine, using at least a credential of the customer and the reservation identifier, that the request to launch the virtual machine instance is authorized; and
   cause the virtual machine instance to be launched on the dedicated hardware server;
   receive a request from the customer to the web service interface to launch a second virtual machine instance using the dedicated hardware server;
   determine, based at least in part on an entry corresponding to the dedicated hardware server in a server database, if the dedicated hardware server has capacity available for supporting the at least one virtual machine instance;
   as a result of the dedicated hardware server not having capacity available for supporting the at least one virtual machine instance, identify a second dedicated hardware server associated with an automatic placement parameter set in a manner that allows automatic placement of virtual machine instances onto the second dedicated hardware server; and
   launch the at least one virtual machine instance using the second dedicated hardware server.

2. The non-transitory computer-readable storage medium of claim 1, wherein the instructions further comprise instructions that, as a result of being executed by the one or more processors, cause the computer system to:
   receive from the customer to a second web service interface running on a hardware server of the plurality of hardware servers, a request to provision the dedicated hardware server;
   select, from a group of available hardware servers of the plurality of hardware servers, a hardware server suitable for dedication to the customer and not having capacity allocated for another customer;
   modify, in a server database, an entry corresponding to the selected hardware server to specify that the selected hardware server has been dedicated for the exclusive use of the customer; and
   enable launch of one or more virtual machine instances using the selected hardware server.

3. The non-transitory computer-readable storage medium of claim 2, wherein selection, from the group of available hardware servers, of the hardware server suitable for dedication to the customer is further based at least in part on a physical proximity to one or more other dedicated hardware servers provisioned for the exclusive use of the customer.

4. The non-transitory computer-readable storage medium of claim 2, wherein the instructions further comprise instructions that, as a result of being executed by the one or more processors, cause the computer system to:
   modify, in the server database, an entry corresponding to the second dedicated hardware server to specify that the at least one virtual machine instance is running within the second dedicated hardware server.

5. The non-transitory computer-readable storage medium of claim 1, wherein the instructions further comprise instructions that, as a result of being executed by the one or more processors, cause the computer system to:
   receive a request, from the customer to the web service interface, to launch at least one virtual machine instance within a capacity group, the capacity group comprising at least the dedicated hardware server;
   determine, based at least in part on a server affinity identifier of the at least one virtual machine instance and capacity available for the capacity group, if the at least one virtual machine instance can be launched using one or more dedicated hardware servers of the capacity group; and
   as a result of the one or more dedicated servers of the capacity group having capacity available to launch the at least one virtual machine instance, identify a dedicated hardware server of the one or more dedicated hardware servers that can be used to launch the at least one virtual machine instance.

6. The non-transitory computer-readable storage medium of claim 1, wherein the instructions further comprise instructions that, as a result of being executed by the one or more processors, cause the computer system to:
   receive, from the customer, a request to the web service interface to re-launch a virtual machine instance, the virtual machine instance previously having been launched using the dedicated hardware server;
   determine, based at least in part on the entry for the dedicated hardware server in the server database, whether the dedicated hardware server has capacity available for supporting the virtual machine instance; and
   as a result of the dedicated hardware server having capacity available for supporting the virtual machine instance, re-launch the virtual machine instance using the dedicated hardware server.

7. The non-transitory computer-readable storage medium of claim 1, wherein the instructions further comprise instructions that, as a result of being executed by the one or more processors, cause the computer system to:
   receive a request, from the customer to the web service interface, to release the dedicated hardware server;
   stop any virtual machine instances operating within the dedicated hardware server;
   indicate, within the entry in the server database for the dedicated hardware server, that the stopped virtual machine instances were implemented within the dedicated hardware server and that the dedicated hardware server has been released; and
   enable the dedicated hardware server to be provisioned for the exclusive use of another customer.

8. The non-transitory computer-readable storage medium of claim 2, wherein the instructions further comprise instructions that, as a result of being executed by the one or more processors, cause the computer system to evaluate one or more entries for a plurality of hardware servers in the server database to identify the group of available hardware servers.

9. A computer-implemented method comprising:
   providing a web service interface running on a hardware server of a plurality of hardware servers;
   receiving, from a customer to the web service interface, a request to launch a virtual machine instance, the request specifying a reservation identifier for a dedicated hardware server, the dedicated hardware server provisioned for the exclusive use of the customer and among the plurality of hardware servers used to run virtual machine instances for a plurality of customers;
   determining, using at least a credential of the customer and the reservation identifier, that the request to launch the virtual machine instance is authorized; and
   causing the virtual machine instance to be launched on the dedicated hardware server;
   receiving a request from the customer to the web service interface to launch a second virtual machine instance using the dedicated hardware server;
   determining, based at least in part on an entry corresponding to the dedicated hardware server in a server database, if the dedicated hardware server has capacity available for supporting the at least one virtual machine instance;
   as a result of the dedicated hardware server not having capacity available for supporting the at least one virtual machine instance, identifying a second dedicated hardware server associated with an automatic placement parameter set in a manner that allows automatic placement of virtual machine instances onto the second dedicated hardware server; and
   launching the at least one virtual machine instance using the second dedicated hardware server.

10. The computer-implemented method of claim 9, further comprising:
    receiving from the customer to a second web service interface running on a hardware server of the plurality of hardware servers, a request to provision the dedicated hardware server;
    selecting, from a group of available hardware servers of the plurality of hardware servers, a hardware server suitable for dedication to the customer and not having capacity allocated for another customer;

modifying, in a server database, an entry corresponding to the selected hardware server to specify that the selected hardware server has been dedicated for the exclusive use of the customer; and
enabling launch of one or more virtual machine instances using the selected hardware server.

11. The computer-implemented method of claim 10, wherein selection, from the group of available hardware servers, of the hardware server suitable for dedication to the customer is further based at least in part on a physical proximity to one or more other dedicated hardware servers provisioned for the exclusive use of the customer.

12. The computer-implemented method of claim 10, further comprising:
receiving a request from the customer to the web service interface to launch a second virtual machine instance using the dedicated hardware server;
modifying, in the server database, an entry corresponding to the second dedicated hardware server to specify that the at least one virtual machine instance is running within the second dedicated hardware server.

13. The computer-implemented method of claim 9, further comprising:
receiving, from the customer to the web service interface, a request to launch at least one virtual machine instance within a capacity group, the capacity group comprising at least the dedicated hardware server;
determining, based at least in part on a server affinity identifier of the at least one virtual machine instance and capacity available for the capacity group, if the at least one virtual machine instance can be launched using one or more dedicated hardware servers of the capacity group; and
as a result of the one or more dedicated servers of the capacity group having capacity available to launch the at least one virtual machine instance, identifying a dedicated hardware server of the one or more dedicated hardware servers that can be used to launch the at least one virtual machine instance.

14. The computer-implemented method of claim 9, further comprising:
receiving, from the customer, a request to the web service interface to re-launch a virtual machine instance, the virtual machine instance previously having been launched using the dedicated hardware server;
determining, based at least in part on the entry for the dedicated hardware server in the server database, whether the dedicated hardware server has capacity available for supporting the virtual machine instance; and
as a result of the dedicated hardware server having capacity available for supporting the virtual machine instance, re-launching the virtual machine instance using the dedicated hardware server.

15. The computer-implemented method of claim 9, further comprising:
receiving a request, from the customer to the web service interface, to release the dedicated hardware server;
stopping any virtual machine instances operating within the dedicated hardware server;
indicating, within the entry in the server database for the dedicated hardware server, that the stopped virtual machine instances were implemented within the dedicated hardware server and that the dedicated hardware server has been released; and
enabling the dedicated hardware server to be provisioned for the exclusive use of another customer.

16. The computer-implemented method of claim 10, further comprising evaluating one or more entries for a plurality of hardware servers in the server database to identify the group of available hardware servers.

17. A system comprising:
a plurality of hardware servers;
a server database that stores associations of customers with hardware servers; and
a management sub-system that:
receives, from a customer to a web service interface running on a hardware server of the plurality of hardware servers, a request to launch a virtual machine instance, the request specifying a reservation identifier for a dedicated hardware server, the dedicated hardware server provisioned for the exclusive use of the customer and among the plurality of hardware servers used to run virtual machine instances for a plurality of customers;
determines, using at least a credential of the customer and the reservation identifier, that the request to launch the virtual machine instance is authorized; and
causes the virtual machine instance to be launched on the dedicated hardware server; and
receives a request from the customer to the web service interface to launch a second virtual machine instance using the dedicated hardware server;
determines, based at least in part on an entry corresponding to the dedicated hardware server in the server database, if the dedicated hardware server has capacity available for supporting the at least one virtual machine instance;
as a result of the dedicated hardware server not having capacity available for supporting the at least one virtual machine instance, identifies a second dedicated hardware server associated with an automatic placement parameter set in a manner that allows automatic placement of virtual machine instances onto the second dedicated hardware server; and
launches the at least one virtual machine instance using the second dedicated hardware server.

18. The system claim 17, wherein the management sub-system further:
receives from the customer to a second web service interface running on a hardware server of the plurality of hardware servers, a request to provision the dedicated hardware server;
selects, from a group of available hardware servers of the plurality of hardware servers, a hardware server suitable for dedication to the customer and not having capacity allocated for another customer;
modifies, in the server database, an entry corresponding to the selected hardware server to specify that the selected hardware server has been dedicated for the exclusive use of the customer; and
enables launch of one or more virtual machine instances using the selected hardware server.

19. The system of claim 18, wherein selection, from the group of available hardware servers, of the hardware server suitable for dedication to the customer is further based at least in part on a physical proximity to one or more other dedicated hardware servers provisioned for the exclusive use of the customer.

20. The system of claim 18, wherein the management sub-system further:
modifies, in the server database, an entry corresponding to the second dedicated hardware server to specify that the at least one virtual machine instance is running within the second dedicated hardware server.

* * * * *